United States Patent [19]

Patel

[11] Patent Number: 5,481,316
[45] Date of Patent: Jan. 2, 1996

[54] SYSTEM, APPARATUS AND METHOD FOR CANCELING TELEVISON GHOST SIGNALS

[75] Inventor: Chandrakant B. Patel, Hopewell, N.J.

[73] Assignee: SamSung Electronics Co., Ltd., Kyungki-do, Rep. of Korea

[21] Appl. No.: 921,686

[22] Filed: Jul. 30, 1992

Related U.S. Application Data

[63] Continuation-in-part of Ser. No. 623,563, Dec. 7, 1990, abandoned, which is a continuation-in-part of Ser. No. 609,522, Nov. 5, 1990, abandoned.

[51] Int. Cl.[6] .................................................. H04N 5/21
[52] U.S. Cl. ................................. 348/614; 348/608
[58] Field of Search .................................. 358/167, 905, 358/36, 166, 37; 348/614, 607, 611, 605, 181, 183, 608; H04N 5/213, 5/205, 5/21

[56] References Cited

U.S. PATENT DOCUMENTS

| | | | |
|---|---|---|---|
| 4,896,213 | 1/1990 | Kobo et al. | 358/905 |
| 5,099,328 | 3/1992 | Kobo et al. | 358/167 |
| 5,103,312 | 4/1992 | Citta | 358/905 |
| 5,138,453 | 8/1992 | Kobayashi et al. | 358/167 |
| 5,170,260 | 12/1992 | Tabata | 358/905 |
| 5,196,936 | 3/1993 | Kobayashi et al. | 358/167 |

FOREIGN PATENT DOCUMENTS

| | | | |
|---|---|---|---|
| 0332219 | 9/1989 | Japan | 388/905 |
| 0252370 | 10/1990 | Japan | 358/905 |
| 0285866 | 11/1990 | Japan | 358/905 |
| 0001664 | 1/1991 | Japan | H04N 5/21 |
| 0073677 | 3/1991 | Japan | H04N 5/21 |
| 0048579 | 3/1991 | Japan | H04N 5/21 |
| 0159480 | 7/1991 | Japan | H04N 5/21 |
| 0167968 | 7/1991 | Japan | H04N 5/21 |
| 0239073 | 10/1991 | Japan | H04N 5/21 |
| 3293870 | 12/1991 | Japan | H04N 5/21 |
| 3288771 | 12/1991 | Japan | H04N 5/21 |

OTHER PUBLICATIONS

Miyazawa et al., Development of a Ghost Cancel Reference Signal for TV Broadcasting, Dec. 1989, pp. 339–347, IEEE Transacting on Broadcasting, vol. 35 No. 4.

Primary Examiner—Victor R. Kostak
Assistant Examiner—Michael H. Lee
Attorney, Agent, or Firm—Robert E. Bushnell

[57] ABSTRACT

A ghost canceling reference signal transmission and reception system utilizes a ghost canceling reference signal including a zero to seventy IRE step followed by a seventy to zero IRE (sin x)/x step.

55 Claims, 7 Drawing Sheets

SYSTEM, APPARATUS AND METHOD FOR CANCELING TELEVISON GHOST SIGNALS

This is a continuation-in-part of U.S. patent application Ser. No. 07/623,563 filed 7 Dec. 1990 and now abandoned, which is a continuation-in-part of U.S. patent application Ser. No. 07/609,522 filed 5 Nov. 1990 and now abandoned.

OTHER RELATED APPLICATIONS

The following U.S. patent applications filed by the inventor and his co-workers are of interest to this application and, where appropriate, the benefits of their filing dates in the United States of America are sought under the provisions of 35 U. S. C., Section 120.

1.) U.S. patent application Ser. No. 07/754,895; filed 4 Sep. 1991 by S. Roy, C. B. Patel and J. Yang; and entitled "SYSTEM TO CANCEL GHOSTS IN NTSC TELEVISION TRANSMISSION"

2.) U.S. patent application Ser. No. 07/872,077; filed 22 Apr. 1992 by C. B. Patel and J. Yang; and entitled "GHOST CANCELLATION REFERENCE SIGNAL AND TELEVISION RECEIVER USING SAME"

3.) U.S. patent application Ser. No. 07/891,058; filed 1 Jun. 1992 by C. B. Patel, S. Roy, and J. Yang; and entitled "SYSTEM TO CANCEL GHOSTS GENERATED BY MULTIPATH TELEVISION SIGNALS"

FIELD OF THE INVENTION

The present invention relates generally to a system, apparatus and method for improving the quality of television pictures and more particularly to the reduction or elimination of ghost images.

BACKGROUND OF THE INVENTION

Ghost images, commonly referred to as "ghosts", are a common occurrence in received television pictures. The signal to which the television receiver synchronizes is called the reference signal, and the reference signal is usually the direct signal received over the shortest transmission path. The multipath signals received over other paths are thus usually delayed with respect to the reference signal and appear as trailing ghost images. It is possible however, that the direct or shortest path signal is not the signal to which the receiver synchronizes. Where the receiver synchronizes to a reflected (longer path) signal, there will be a leading ghost image caused by the direct signal, or there will a plurality of leading ghosts caused by the direct signal and other reflected signals of lesser delay than the reflected signal to which the receiver synchronizes. The multipath signals vary in number, amplitude and delay time from location to location and from channel to channel at a given location. The parameters of a ghost signal may also be time-varying.

The visual effects of multipath distortion can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. Usually, the direct signal predominates, and a receiver is synchronized to the direct signal. In such case the ghost images are displaced to the right at varying position, intensity and polarity. These are known as trailing ghosts or "post-ghost" images. In the less frequently encountered case where the receiver synchronizes to a reflected signal, there will be one or more ghost images displaced to the left of the reference image. These are known as leading ghosts or "pre-ghost" images.

Multipath signals of relatively short delay with respect to the reference signal do not cause separately discernible copies of the predominant image, but introduce distortion into the frequency response characteristic of the channel. The visual effect in this case is observed as increased or decreased sharpness of the image and in some cases loss of some image information. These short-delay or close-in ghosts are most commonly caused by unterminated or incorrectly terminated radio frequency transmission lines such as antenna lead-ins or cable television drop cables. In a cable television environment, it is possible to have multiple close-in ghosts caused by multiple taps with improperly terminated drop cables of varying lengths. Such multiple close-in ghosts are frequently referred to as "micro-ghosts".

in the prior art, long multipath effects, or macroghosts, are typically reduced by cancelation schemes. In the prior art short multipath effects, or microghosts, are typically alleviated by waveform equalization, generally by peaking and/or group-delay compensation of the high frequency video response.

The phenomenon of television ghosts has been addressed with a view to improving picture quality by reducing or eliminating ghosts. See, for example, W. Ciciora et al., "A TUTORIAL ON GHOST CANCELING IN TELEVISION RECEIVERS", IEEE Transactions on consumer Electronic, vol. CE-25, February 1979, pp. 9–43. Other solutions to the problem of ghosts are described in U.S. Pat. No. 4,896,213, Jan. 23, 1990, Kobo et al. and U.S. Pat. No. 4,897,725, Jan. 30, 1990, Tanaka et al., the disclosure of which is herein incorporated by reference.

Since the characteristics of a transmitted television signal are known a priori, it is possible, at least in theory, to utilize such characteristics in a system of ghost signal detection and cancelation. Nevertheless, various problems limit this approach. Instead, it has been found desirable to transmit repeatedly a reference signal situated, for example, in a section of the TV signal that is currently unused for video purposes and to utilize this reference signal for detection and cancelation of ghost signals. Typically, lines in the vertical blanking interval (VBI) are utilized. Such a signal is herein referred to as a Ghost Canceling Reference (GCR) signal.

The strategy for eliminating ghosts in a television receiver relies on the transmitted GCR signal suffering the same multipath distortions as the rest of the television signal. The receiver can then examine the distorted GCR signal it receives and, with a priori knowledge of the waveform of a distortion-free GCR signal, can configure an adaptive filter to cancel, or at least significantly attenuate, the multipath distortion. It is important to choose a GCR signal that does not take up too much time in the VBI (preferably no more than one TV line), but that still contains sufficient information to permit the receiver to analyze the multipath distortion and configure an compensating filter to cancel the distortion.

It has been proposed that a useful test or GCR signal may appropriately exhibit a (sin x)/x waveform. Such a waveform, suitably windowed, exhibits a relatively constant spectral energy density over a frequency band of interest. See, for example, the above-mentioned tutorial paper by W. Ciciora et al. Ghost locations can then be determined for ghost signal cancelation and waveform equalization to reduce the affects of short multipaths.

The above-mentioned U.S. Pat. No. 4,896,213 discloses a ghost canceling signal transmission/reception system which allows a built-in ghost canceling device to reduce or eliminate ghost components attributable to group-delay distortion and frequency-amplitude characteristic distortion generated in a signal transmission path. This is achieved by superimposing a digital signal on a television signal as a ghost canceling reference signal. Thus, as disclosed in the above-mentioned U.S. Pat. No. 4,896,213, a digital signal composed of frame synchronizing signals, clock synchronizing signals, and data signals is generated. This digital signal is superposed, during the vertical blanking interval, on a television signal to be transmitted. At the receiving end, the digital signal superposed on the television signal is utilized as a reference signal in an arrangement that executes a correlative operation of the transmitted television signal to compute the parameters for the adaptive filter circuits used to reduce the ghost phenomena.

In the arrangement disclosed in the above-mentioned U.S. Pat. No. 4,897,725, a transmitted reference or GCR signal is also used. A dummy ghost signal is generated and is utilized for canceling a ghost signal in the transmitted television signal. This is substantially the proposed BTA (Japan) GCR signal, which utilizes as the main reference or deghosting signal, a signal having aformentioned (sin x)/x waveform, principally for its property of spectral energy content uniformly distributed throughout the frequency domain. Averaging with a pair-wise constant signal is utilized for deriving a received reference waveform. The received reference waveform is Fourier transformed to provide a set of Fourier coefficients. The transformed reference waveform is then processed with an available FFT of an unimpaired GCR to compute the deghosting filter parameters, that is, tap gain information for a transversal filer, for both waveform equalization (finite impulse response, FIR) and the deghosting filter (infinite impulse response, IIR).

As can be expected, the GCR signal is generally received accompanied by its ghost signals and is thus itself a "ghosted" signal. As evidenced in U.S. patent application Ser. No. 07/609,522 filed 5 Nov. 1990, the inventor recognized that the performance of a ghost canceling system is greatly influenced by the noise and perturbation content of the acquired GCR signal. The inventor also recognized, as evidenced in his patent application Ser. No. 07/609,522, that a reduction in the noise and perturbation content of the acquired GCR signal is desirable in improving the accuracy of the deghosting filter parameter derivations and in reducing the system complexity.

The inventor further recognized, as evidenced in patent application Ser. No. 07/609,522, that a step in the signal leading edge is desirable in a GCR signal in computing ghost locations. As previously mentioned, a (sin x)/x waveform provides particular advantages in a GCR signal: its flat frequency spectrum allows accurate computation of the filter parameters for attenuating multiple image effects as well as computation of the waveform equalizing parameters. However, the characteristic ripples of the (sin x)/x waveform, along with other high frequency components, are typically attenuated in a received ghosted GCR, both due to multipath effects as well as effects of antenna misorientation as commonly occurs in practice. Under such conditions, the computation of the waveform equalizing parameters can be significantly in error. These problems are particularly apparent when a (sin x)/x step is utilized for the leading edge, as in the proposed BTA (Japan) GCR signal.

The initial portion of the GCR signal, then, should be substantially ripple-free. Too rapidly rising an initial step will contain substantial high-frequency content that is outside the bandwidth constraint imposed by the broadcast television standard. The filtering of the video signal at the transmitter to keep the video signal within that bandwidth constraint will remove the above-band frequency content, giving rise to ringing in the step edge. This ringing is Gibbs's phenomenon. A 2T type step has a 10 to 90% rise-time of 250 nanoseconds and a frequency spectrum to 4 MHz; in a television transmission system having 6 MHz video signal bandwidth this step is transmitted substantially without attendant ringing.

A simple step does not contain all frequencies, however, and a 2T type step does not provide as much high frequency energy as desired. These deficiencies hamper the computation of weighting coefficients for filtering to equalize across band the amplitude response from the ghost cancellation circuitry. Using an FIR filter for the equalization of the amplitude response across band results in a concomitant linearization of phase response and suppresses microghosts.

When the high frequency energy content of the initial portion of the GCR signal is kept low to avoid ripple therein, the final portion of the GCR signal should include the high frequency energy content required for computing weighting coefficients for equalization across band. The inventor suggested in U.S. patent application Ser. No. 07/609,522 that a GCR signal including a pulse with a leading edge 2T type step, a trailing edge (sin x)/x step and a sustained relatively constant level therebetween met his criteria for a good GCR signal.

A GCR signal using Bessel chirps subsequently publicly proposed by U.S. Philips Corp. also meets the inventor's criteria for a good GCR signal. The distribution of energy in the Bessel chirp signal has a frequency spectrum extending continuously across the composite video signal band. The chirp starts at the lowest frequency (about 200 kHz) and sweeps upward in frequency therefrom to the highest frequency (about 4.2 MHz). The chirp is inserted into the first halves of selected VBI lines. Bessel pulse chirps, each of 35 microsecond duration, begin 12 microseconds into the $19^{th}$ VBI scan lines of each cycle of eight successive fields with chirp polarity alternating from field to field within each frame and being reversed each second frame. These chirps swing plus/minus 40 IRE from 30 IRE "gray" pedestals which extend from 12 to 48 microseconds into these VBLI lines. Because of the similarities of the Bessel pulse chirp signal to the GCR signal that includes a leading edge 2T type step, a trailing edge (sin x)/x step and a relatively constant level therebetween, the signals can be processed similarly to effect ghost cancelation. Both signals are contained within an envelope of about 80 IRE units.

SUMMARY OF THE INVENTION

The invention concerns a novel ghost canceling reference signal, its generation and its use for canceling ghost signals. In accordance with an aspect of the invention, a ghost canceling reference signal transmission system comprises a source for producing a ghost canceling reference signal, a preferred ghost canceling reference signal comprising a pulse having a first, leading edge 2T type step and a second, trailing edge (sin x)/x type step; an arrangement for superposing the ghost canceling reference signal on a television signal for transmission in a vertical blanking interval of the television signal; and a transmission arrangement for transmitting the television signal having the ghost canceling reference signal superposed thereon. Another aspect of the invention is embodied in a receiving arrangement for receiving a television signal transmitted with the novel ghost canceling reference signal therein, which receiving arrangement includes a cancelation arrangement for canceling a ghost signal, an arrangement for retrieving the ghost canceling reference signal from the television having been received, and an arrangement for processing the ghost canceling reference signal for deriving therefrom a ghost cancelation control signal for controlling the cancelation means.

A 2T type step as mentioned in this summary has a 10 to 90% rise-time of 250 nanoseconds and a frequency spectrum to 4 MHz. However, in practice a 1.2T or 1.5T step can be utilized when that is best suited for the bandwidth of the transmission medium under consideration. Thus, a 2T step is used herein with this meaning intended. Preferably, the first step is a "simple" zero-to-seventy-IRE 2T type step; the second step is a seventy-to-zero-IRE (sin x)/x type step; and the first and second steps have respective rise and fall times (10 to 90%) of about 250 nanoseconds.

Preferably, in accordance with a further aspect of the invention, the cancelation arrangement for canceling a ghost signal handles macroghost and microghost on a separable filtering basis, using a cascade arrangement of: an IIR filter for canceling macroghosts, and an FIR filter for performing the equalization across band that suppresses the effects of microghosts. The arrangement for processing the ghost canceling reference signal first determines the weighting coefficients for the IIR filter for canceling lagging macroghosts, and subsequently determines the weighting coefficients for the FIR filters that canceling leading macroghosts and that shape the amplitude response across band.

DESCRIPTION OF THE PREFERRED EMBODIMENTS

Figure 1:
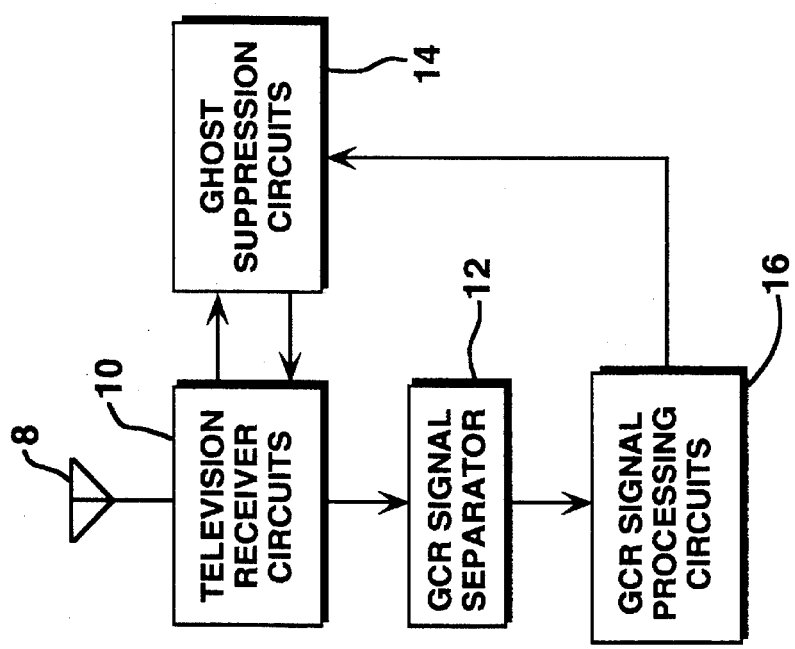
FIG. 1 is a block diagram of a television system constructed and operated in accordance with aspects of the invention, so as to cancel ghosts generated by the multipath transmission of television signals.
Figure 1:
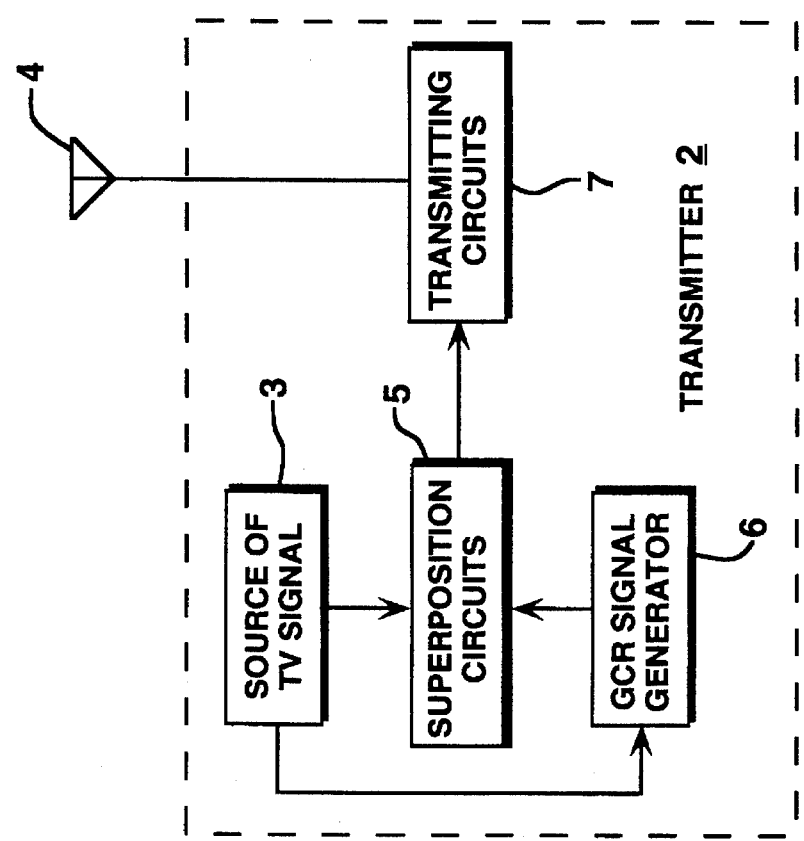

FIG. 1 shows both the transmitting and receiving sides of a television system constructed and operated so as to cancel ghosts generated by the multipath transmission of television signals. On the receiving side of the system, shown in the lefthand portion of FIG. 1, a television transmitter 2, such as a television broadcast transmitter, is coupled to a transmitting antenna 4 for transmitting a television signal. A ghost canceling reference (GCR) signal source or generator 6 supplies a GCR signal to transmitter 2 in accordance with an aspect of the invention. Television transmitter 2 is shown to comprise superposition circuits 5 for superposing or combining the GCR signal with television signals from a source 3 of a television signal for transmission by transmission circuits 7 to the transmitting antenna 4. TV transmitter 2 supplies a video signal to signal source 6 for use in generating the GCR signal, as will be further explained later on in this specification.

A representative transmitter architecture comprises a studio synchronizing signal generator, a television camera for supplying three color signals, a processing amplifier for generating composite video signal proceeding from the three color signals supplied by the camera and from synchronizing signals supplied from the studio synchronizing signal generator, apparatus for time-division multiplexing information such as the GCR signal into selected lines of the composite video signal occuring during vertical blanking intervals, a vestigial sideband amplitude-modulation radio-frequency transmitter for the composite video signal with information time-division multiplexed into the vertical blanking intervals, a frequency-modulation radio-frequency transmitter for sound, and the transmitting antenna 4 to which the AM and FM transmitters are each coupled. The AM and FM transmitters may share one or more final stages before the transmitting antenna 4. The camera has the scanning of images from its photosensing portions controlled by scanning signals from the studio synchronizing signal generator.

The studio synchronizing signal generator typically includes a crystal-controlled oscillator for generating oscillations at a multiple of color carrier frequency, together with a binary counter chain for counting the oscillations and for dividing the count to generate counts of the scan lines in each field scan, and to generate counts of the field scans modulo eight. These elements are combined with appropriate blanking circuitry to generate timing signals for standard horizontal and vertical scan synchronization pulses together with appropriately inserted equalizing pulses, to generate chroma burst, and to generate windowing pulses indicative of the active portions of scanning lines as occur between synchronizing intervals. The processing amplifier responds to these signals to generate suitable pedestals in the composite video signals.

In operation, ghost canceling reference (GCR) signal source 6 supplies television transmitter 2 with a GCR signal in accordance with the invention and synchronized to the video signal transmitted by transmitted 2. The oscillations per scan line can be counted in the studio synchronizing signal generator and used together with the modular field count to address read-only memory that stores the ghost cancelation reference signal in digitized form. An analog-to-digital converter can convert the digitized GCR signal to analog form for application to the superposition circuits 5, there to be time-division multiplexed with the television signal from the source 3. The superposition circuits 5 introduce the GCR signal into the active portion of a scan line in the vertical blanking interval that is selected by the scan line counter in the studio synchronizing signal generator.

On the receiving side of the system, shown on the righthand side of FIG. 1, a receiving antenna 8 picks up radio-frequency energy transmitted from transmitting antenna 4 as may be received via a direct path and multipaths. The multipaths will introduce ghosts into the received television signal including the GCR signal portions thereof. The receiving antenna 8 supplies the radio-frequency energy it picks up to a television receiver 10. A GCR signal separator 12 separates a GCR signal from a video signal detected by the receiver 10. GCR signal separator 12 supplies the separated GCR signal to GCR signal processing circuits 16. The ghosts accompanying the GCR signal, the nature of which GCR signal is predetermined, are measured in the GCR signal processing circuits 16 and used as a basis for calculating ghost suppression parameters. These ghost suppression parameters are supplied to ghost suppression circuits 14, which receive ghosted video signal from a video detector within the television receiver 10, to determine the filtering they are to exert on the ghosted video signal. The ghost suppression circuits 14 respond to the ghosted video signal to generate a deghosted video signal that is returned to the television receiver 10 for further processing.

The ghost suppression circuit 14 can take one of several general forms known in the prior art. In one form of ghost suppression circuit, under the control of a cut-and-try computer program, the known GCR signal with various incremental delays, as fit within a gating interval (or "window") are weighted and summed. The weighted sums are then compared to the actually received GCR signal and attendant ghosts that occur during the gating interval. When a match is found, the filter characteristic of the transmission medium is then known. Once the filter characteristic of the transmission medium is known, a complementary filter is created to receive the ghosted signal and provide a response with ghost cancelation.

In another form of ghost suppression circuit, the Fourier transform is taken of the ghosted GCR signal that occurs during the gating interval, then divided by the known Fourier transform of the ghost-free GCR signal that occurs during the gating interval, to obtain the Fourier transform of the transmission medium. The inverse Fourier transform is taken to determine the time-domain response of the transmission medium. Once the filter characteristic of the transmission medium is known, a complementary filter is created to receive the ghosted signal and provide a response with ghost cancelation.

Figure 2:
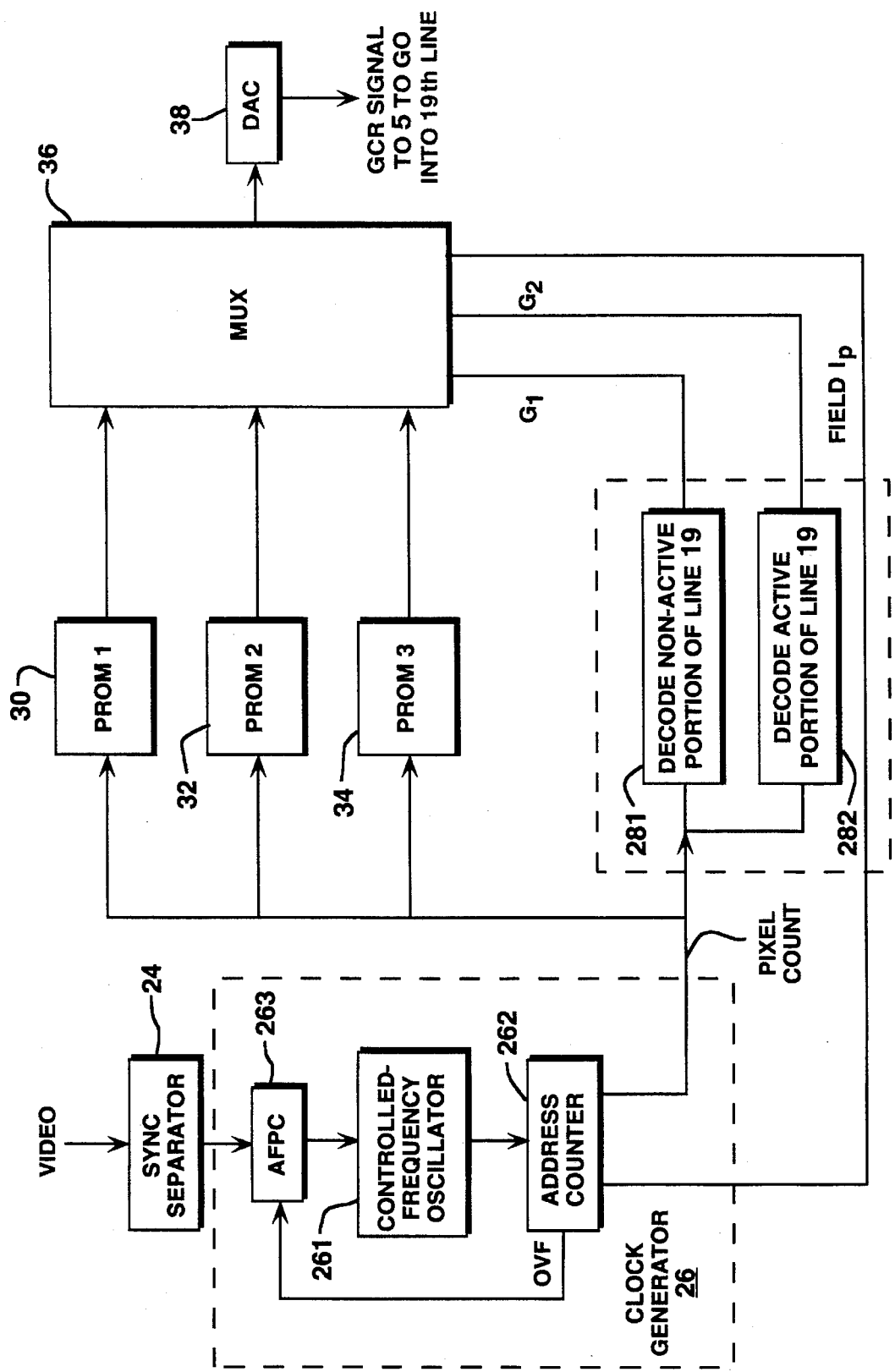
FIG. 2 is a block diagram of a generator for ghost cancelation reference signal, as may, in accordance with an aspect of the invention, be used in the transmitter portion of the FIG. 1 system.

FIG. 2 shows in greater detail a specific GCR signal source 6 for supplying a GCR signal in accordance with the invention. The video signal from television transmitter 2 is applied to a sync separator 24 which supplies the sync signal to a clock generator 26 and to a gating pulse generator 28. First, second, and third programmable read-only memories (PROMs) 30, 32, and 34, respectively, are programmed in accordance with the GCR signal parameters in accordance with the invention and are coupled to a multiplexer 36. The digital GCR signal supplied from the multiplexer 36 is converted to analog form by a digital-to-analog converter 38, and the analog GCR signal supplied from the converter 38 is supplied back to the superposition circuits 5 of FIG. 1 to be time-division-multiplexed into the composite video signal supplied to the transmitting circuits 7 of FIG. 1 to modulate the video carrier. As will be further explained below in reference to the GCR signal, PROM 30 stores tho front porch, horizontal synch pulse, back porch and color burst appropriate to the VBI scan line prescribed for containing the GCR signal in odd fields; and PROM 32 stores a zero to seventy IRE step followed by a seventy to zero IRE (sin x)/x step comprising the GCR signal.

PROM 34 is optional, being used in one variant of the invention to store a zero IRE signal for insertion into a prescribed VBI scan line in even fields, in which variant the prescribed VBI scan line in even fields is chosen such that the color burst is similarly phased in the prescribed VBI scan lines in the even fields and in the odd fields. The multiplexer 36 may simply select a wired zero IRE signal, rather than selecting the zero IRE signal from a PROM. In another variant of the invention in which the multiplexer 36 selects a wired zero IRE signal, rather than selecting it from a PROM, the PROM 34 can be utilized to store the front porch, horizontal synch pulse, back porch and color burst appropriate to the VBI scan line prescribed for containing a zero IRE signal in even fields for an alternative embodiment of the invention. This permits the VBI scan line prescribed for containing a zero IRE signal in even fields to be chosen as one in which chroma burst is opposite rather than the same in phase as in the VBI scan line prescribed for containing the GCR signal in odd fields.

Clock generator 26 is shown as being of a type wherein a high-frequency controlled-frequency oscillator 261 supplies pulses to an address counter 262 that counts the pulses occuring throughout a frame. The count is preferably provided in a binary-coded format in which the most significant bit of the count can be used directly by the gating pulse generator 28 to supply a field identification signal, FIELD ID, without need for any further decoding. The binary-coded format is preferably one in which the less significant bits from the address counter 262 can be used (directly or as combined with a digital offset value) for addressing the PROMs 30, 32, and 34. That is, the least significant bits from the address counter 262 is a binary-coded expression of pixel position along a horizontal scan line, and the bits of intermediate significance provide a binary-coded expression of the scan line count within a field. Synchronization information from the sync separation circuitry and the overflow bit from the address counter 262 are supplied to an automatic frequency and phase control circuit 263 for the controlled oscillator 261. If the GCR signal is being inserted into the composite video signal in a television studio the address counter 262 is usually available in the studio synchronizing signal generator, and then the synch separator 24 and AFPC 263 will not have to be used.

Gating pulse generator 28 is coupled to multiplexer 36 for supplying thereto first and second gating pulses, G1 and G2, and a field identification signal, FIELD ID. The first gating pulse G1 is generated by a decoder 281 decoding the addresses supplied from the address counter 262 that describe the "non-active" or "retrace" portions of the ($19^{th}$) horizontal scan line during which the front porch, horizontal synch pulse, back porch and color burst all occur. The second gating pulse G2 is generated by a decoder 282 decoding the addresses supplied from the address counter 262 that describe the "active" or "trace" portions of the ($19^{th}$) horizontal scan line.

In operation, multiplexer 36 receives respective signal components from PROM's 30, 32, and 34 and, responsive to gating pulses, G1 and G2, and field identification signal FIELD ID as will be further explained below, to generate a digital GCR signal that is converted to analog form by a digital-to-analog converter 38. Essentially, to generate the GCR signals shown in FIGS. 3A and 3B, the gating pulse G1 is used to enable the reading of PROM 30; the gating pulse G1 is gated with one bit condition of the field identification signal FIELD ID to enable the reading of PROM 32; and the gating pulse G1 is gated with one bit condition of the field identification signal FIELD ID to enable the reading of PROM 34. The resulting analog GCR signal is supplied to the superposition circuits 5 of FIG. 1 to be inserted into the composite video signal supplied to the transmitting circuits 7 of FIG. 1 for modulating the video carrier.

The PROMs 30, 32, and 34 may be replaced by other forms of read-only memory (ROM).

Figure 3:
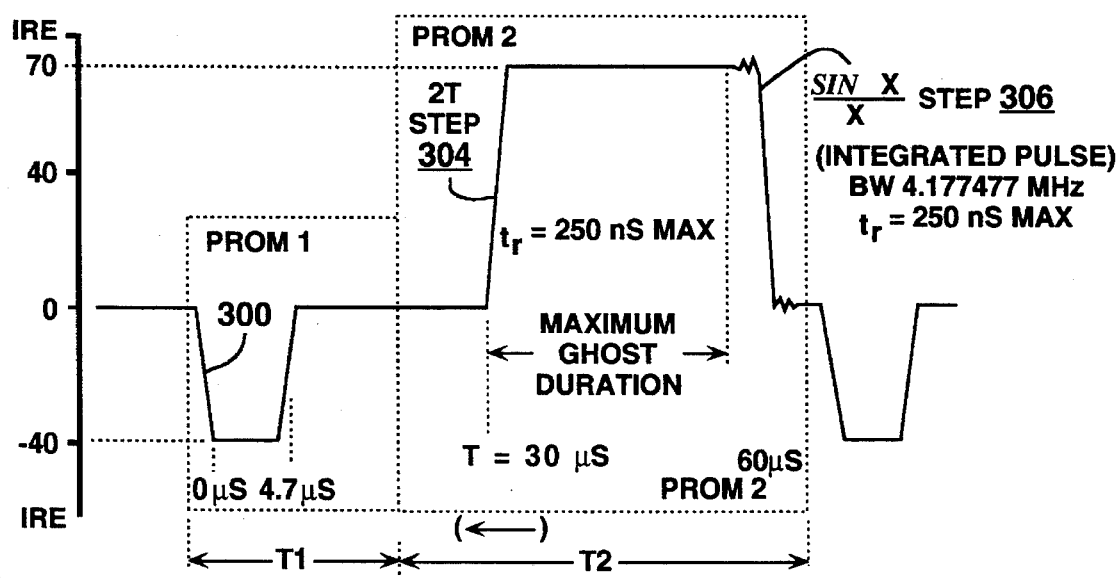
FIGS. 3 and 4 show graphs of waveforms, not to exact scale, helpful in understanding an aspect of the invention.

FIG. 3 shows a graph of a waveform provided by GCR signal source 14, in accordance with the invention. For convenience IRE units are utilized in the waveform characterization, in accordance with the IRE standard scale. This is a linear scale for measuring the relative amplitudes of the various components of a television signal. See, for example, Television Engineering Handbook, K. Blair Benson, Editor in Chief, McGraw-Hill Bood Company, New York; 1986, Section 21.41. Time is measured in FIG. 3 beginning at zero at the finish of the leading edge of a horizontal sync pulse 300. Horizontal sync pulse 300 is normally followed by a chroma or color burst signal 302 on all lines in the vertical blanking interval; however, in the exemplary embodiment to be described next, the chroma burst signal is omitted, as will be explained.

The further characteristics of the GCR signal in accordance with an exemplary embodiment of the invention, shown in FIG. 3, are as follows:

a first step portion 304 is a "simple" 0 to 70 IRE 2T type step;

a second step portion 306 is a 70 to 0 IRE (sin x)/x step; and the rise and fall times of the steps (10 to 90%) are about 250 nanoseconds.

A 2T step signal having a rise time of 250 nanoseconds can be completely specified within about 750 nanoseconds, corresponding to 11 samples of the sampling clock having a frequency of $4f_c$ where $f_c$ is the color subcarrier frequency. In contrast, a (sin x)/x step requires a minimum of 2 microseconds. The shorter time-span required for a 2T type step specification, as well as its freedom from ripples provides an efficient means for the computation of ghost locations and for the computation of adaptive deghosting filter parameters.

The integrated pulse bandwidth is 4.177377 MHz. In the exemplary embodiment shown, the start of first step portion 304 is selected to be at T= 30 microseconds. As will be understood by those skilled in the art, the maximum deghosting range, that is, the maximum multipath that can be handled without running into an "aliasing" type of problem with the next horizontal line period is determined by the duration of the GCR signal and the remaining period within which a ghost signal can be found. In the present exemplary embodiment, the chroma burst is omitted so the leading step edge 304 can be advanced as to provide the postghosts a maximum deghosting range of up to 30 microseconds.

Since the preghosts to be considered are of relatively short duration, being typically of 3 microseconds duration or less, it is not necessary for the GCR signal to be "pair-wise" constant and thus the GCR signal is limited to just one line in a vertical blanking interval and is repeated identically on all fields. Because of the very limited requirement with regard to vertical blanking lines, this GCR signal is readily accommodated in a television signal.

Figure 4A:
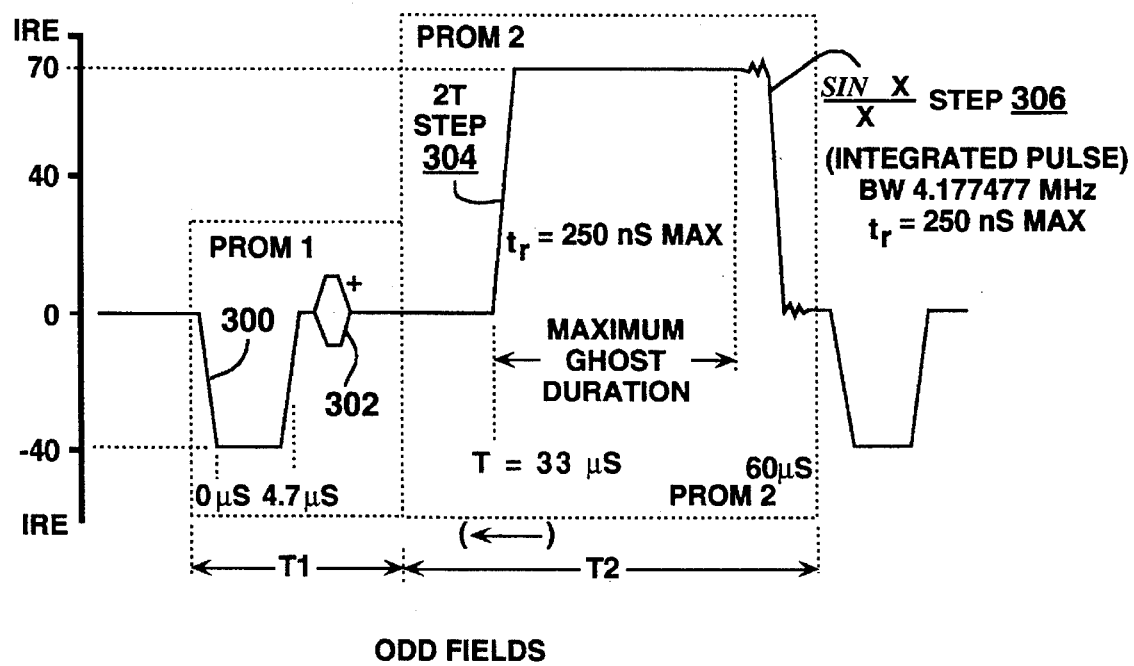
Figure 4B:
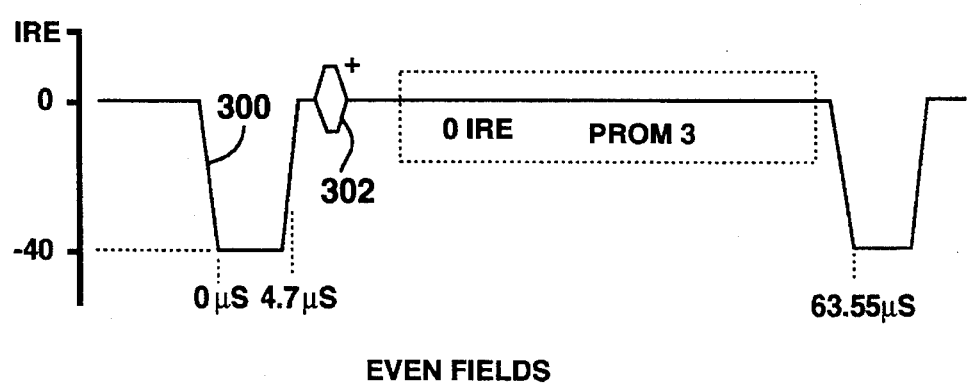

If it is infeasible to omit the chroma burst, for example, because of transmitter limitations, the GCR signal is modified as shown in FIG. 4A and 4B. The waveform of FIG. 4A is essentially the same as the waveform shown in FIG. 3, except that the first step portion starts at about T= 33 microseconds and the waveform is present only on odd fields. Only on a vertical blanking interval line in the next even field wherein the same chroma phase obtains, the waveform is as shown in FIG. 4B, with an extended flat portion at 0 IRE instead of the first and second step portions. The vertical blanking interval line from the odd field, shown in FIG. 4A, can be temporarily stored in appropriate memory until the vertical blanking interval line from the succeeding even field, shown in FIG. 4B, occurs. Subtractively combining the vertical blanking interval line shown in FIG. 4B with the vertical blanking interval line shown in FIG. 4A drawn from temporary storage results in a signal resembling the FIG. 4A vertical blanking interval line except for the horizontal synchronizing pulse 300 and the color burst 302 being replaced with a substantially flat 0 IRE level. Because the horizontal synchronizing pulse 300 and the color burst 302 are the same in the two lines being differentially combined, these components cancel in the resulting signal. With the horizontal synchronizing pulse 300 and the color burst 302 no longer present to interfere with preceding ghosts, the deghosting range for leading, or preceding ghosts is extended to as long as 33 microseconds. This is somewhat longer than the up to 25 microsecond deghosting range for lagging, or succeeding ghosts, which range is set by how early the leading edge 304 of the GCR pulse is respective to the beginning of the trailing edge 306.

The occurrences of the FIG. 4A vertical blanking interval line and of the FIG. 4B vertical blanking interval line as between even and odd fields is reversed in an alternative embodiment of the invention. Thus the first and second step portions can be set to occur only in an odd-numbered field of the television signal. The first step thus begins 33 microseconds after the start of a horizontal sync pulse and the ghost canceling reference signal further comprises, in a next following even numbered field wherein the same chroma phase obtains, a flat portion at 0 IRE in place of the first and second steps.

If it is desired to increase the deghosting range to greater than 30 microseconds, a "pair-wise constant" feature is adopted in which the GCR signal is specified over two consecutive vertical blanking interval (VBI) lines in each vertical interval. The later of these lines resembles the FIG. 4A signal in odd fields, except for the leading edge portion 304 of the GCR pulse being advanced in time (moving in the direction of the arrow), and resembles the FIG. 4B signal in even fields. The earlier of these lines is occupied by a signal (hereafter called a non-varying-with-time signal) which signal is the same during the field in which the VBI lines that are delayed occur and during the subsequent field in which the VBI lines occur that are combined with the delayed VBI lines to cancel the horizontal sync, color burst and their ghosts. The subtractive combining of the non-varying-with-time signal from a previous field with the non-varying-with-time signal from the next field results in a over a line of 0 IRE level preceding the time the leading edge portion 304 of the GCR pulse occurs in the resulting differential signal. The leading edge portion 304 of the GCR pulse can be advanced in time (moving in the direction of the arrow) to reduce the deghosting range for leading, or preceding ghosts to be little longer than 3 microseconds or so. This increases to somewhat over 50 microseconds the deghosting range for lagging, or succeeding ghosts, which range is set by how early the leading edge 304 of the GCR pulse is respective to the end of the next succeeding scan line and the occurrence of the succeeding horizontal sync pulse.

There is a tendency for the GCR signals, which are the same from frame to frame, to be accompanied by noise, which differs from frame to frame. Frame-to-frame averaging can be used to improve the signal-to-noise ratio of the GCR signals, since the lines of GCR signals (being correlated) combine in accordance with scalar addition, while the lines of noise signals (being random) combine in accordance with vector addition. Representative apparatus for performing frame-to-frame averaging to improve the signal-to-noise ratio of the GCR signals during their separation from the composite video signal supplied from a video detector will be described in some detail further on in this specification, referring to FIG. 6.

Computed filter parameters are very dependent on the accuracy with which the lobes or ringing portion of the (sin x)/x function can be received. However, as has been previously alluded to, the signal transmission path can attenuate the higher video frequencies such that the (sin x)/x ringing portion is practically lost. Thus, the received (sin x)/x pulse can exhibit a roll-off and be substantially different from the transmitted pulse, even under no-ghost conditions. Under such conditions, the computed filter parameters using the rolled-off ghosted pulse are not optimal.

In accordance with an aspect of the invention, the ghosted 2T step that is received is separated from the remaining video, including the final (sin x)/x step portion of the GCR signal, and is used to compute the weighting parameters of an infinite impulse response (IIR) deghosting filter. This IIR digital filter is separable into component IIR and FIR digital filter portions. The ghosted GCR signal is processed through this digital filter to provide deghosted video, including a GCR signal. This deghosted GCR signal includes the (sin x)/x step in deghosted form, which is utilized for computing the waveform equalizing filter parameters. The equalizing filter parameters computed from the deghosted (sin x)/x step are more accurate than the filter parameters would be if computed using the rolled-off, ghosted (sin x)/x pulse.

The deghosted (sin x)/x step is separated from the remaining video, including the initial 2T step portion of the GCR signal, is analyzed to estimate the effects of nearby ghosts. A decision is then made as to whether to perform waveform equalization, depending on the characteristics of the nearby ghost locations, including location, amplitude, and phase. Typically, the equalization required is in the form of peaking, utilizing a finite impulse response (FIR) filter structure. Equalization is only performed if the amount required is moderate. Under conditions of a large amount of high frequency attenuation, where much compensation is needed, it is considered inadvisable to perform waveform equalization.

Figure 5:
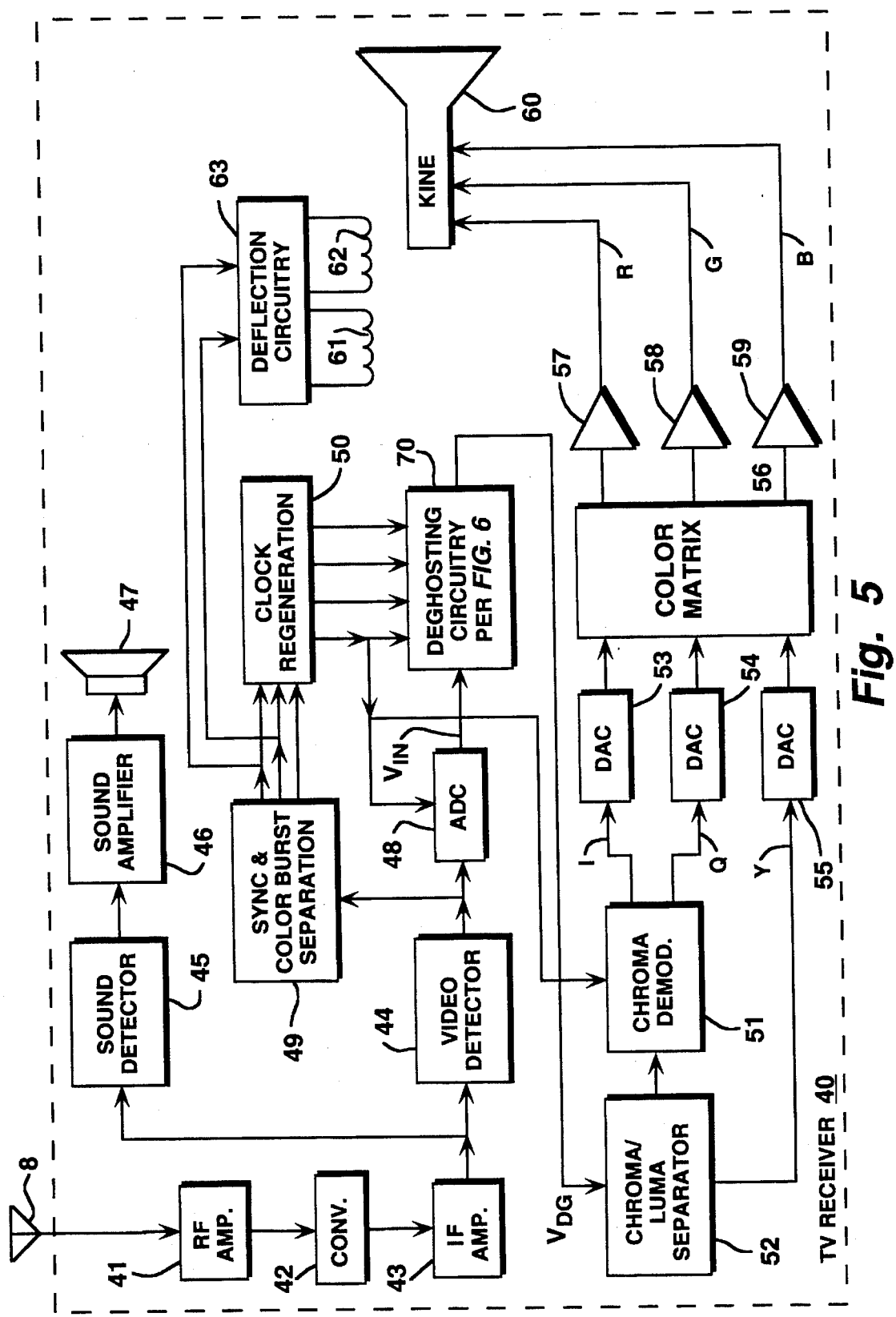
FIG. 5 is a more detailed block diagram of the television receiver portion of the FIG. 1 system.

FIG. 5 shows in greater detail a television receiver 40, which is of the same sort shown in U.S. patent application Ser. No. 07/891,058, and which in accordance with an aspect of the invention includes deghosting circuitry 70. The deghosting circuitry 70 includes, as will be described with reference to FIG. 6 further on in this specification, exemplary circuitry for the GCR signal separator 12, GCR signal processing circuits 16 and ghost suppression circuits 14 of FIG. 1. The remaining portions of the television receiver 40 are exemplary of the television receiver circuits 10 of FIG. 1.

In FIG. 5 the receiving antenna 8 supplies the received portions of the signal to a radio-frequency amplifier 41 within the television receiver 40. The r–f amplifier 41 supplies amplified response to the received television signals to a converter 42, which responds to supply an intermediate-frequency signal to an intermediate-frequency amplifier 43. The amplified i–f response from the i–f amplifier 43 is supplied to a video detector 44 and to a sound detector 45. The sound detector 45, which may be of intercarrier type, supplies detected sound signal to a sound amplifier 46, which supplies audio power to a loudspeaker 47. Alternatively, the sound detector may be followed by a stereophonic sound detector, two sound amplifiers and right and left loudspeakers.

The video detector 44 supplies composite video signal to an analog-to-digital converter 48 and to synchronizing-signal and color-burst separation circuitry 49. Circuitry 49 is associated with clock regeneration circuitry 50, in which circuitry 50 a phase- and frequency-controlled crystal oscillator is locked to a multiple of the separated color burst frequency, and in which circuitry 50 digital counters are arranged to perform frequency division. The circuitry 50 supplies, at a rate typically four times the color subcarrier frequency $f_c$, a digital clock signal to the analog-to-digital converter 58, to digital filters in deghosting circuitry 70, and to a chroma demodulator 51. The digital counters in the clock regeneration circuitry 50 supply the deghosting circuitry 70 with scan line count information for each successive field, with which to gate the acquisition of GCR signals. The digital counters in the clock regeneration circuitry 50 may also supply the deghosting circuitry 70 with field count information to gate further the acquisition of GCR signals.

Figure 6:
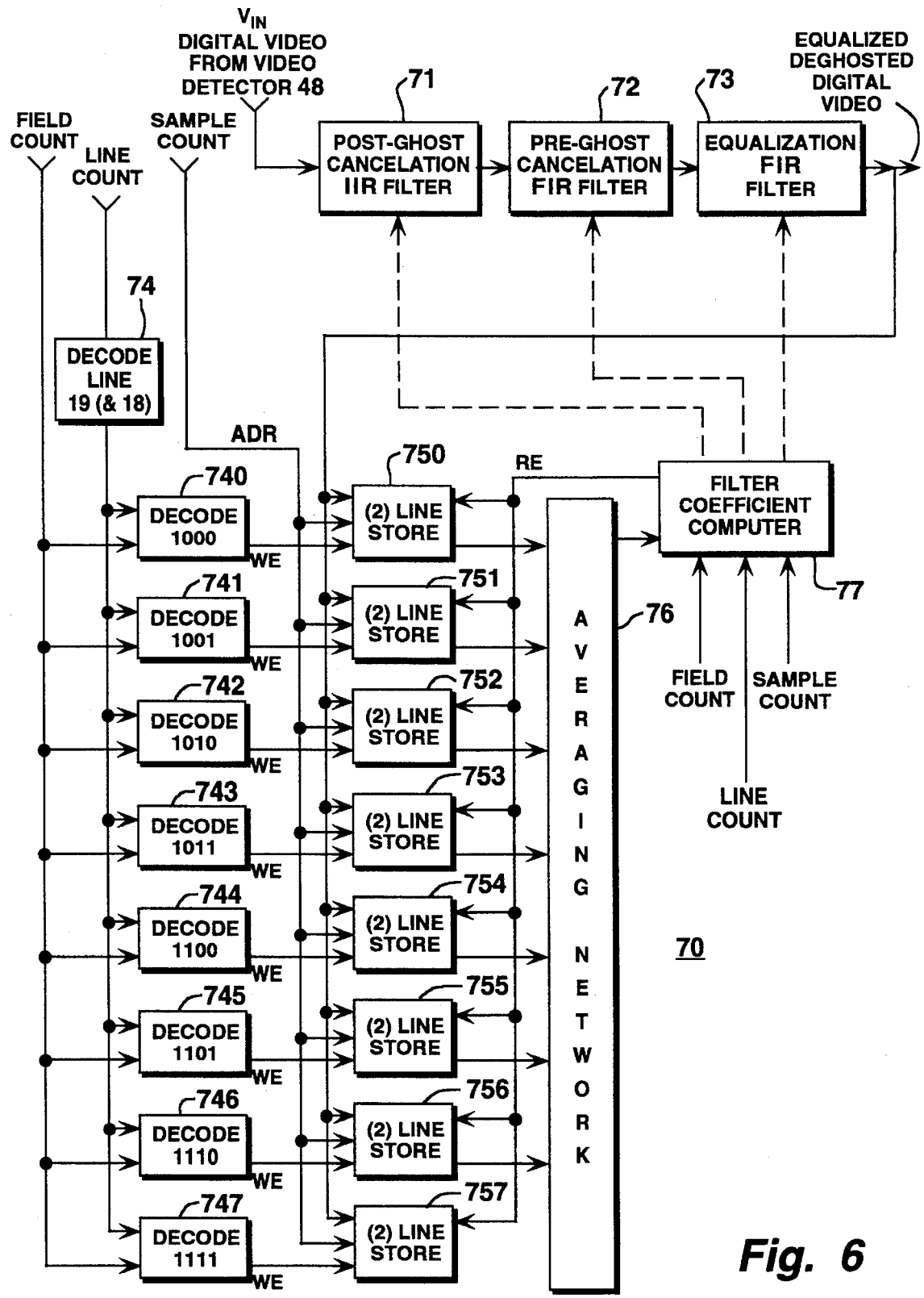
FIG. 6 is a block diagram showing in greater detail the deghosting circuitry of the FIG. 5 television receiver, which deghosting circuitry is constructed in accordance with an aspect of the invention.
Figure 7:
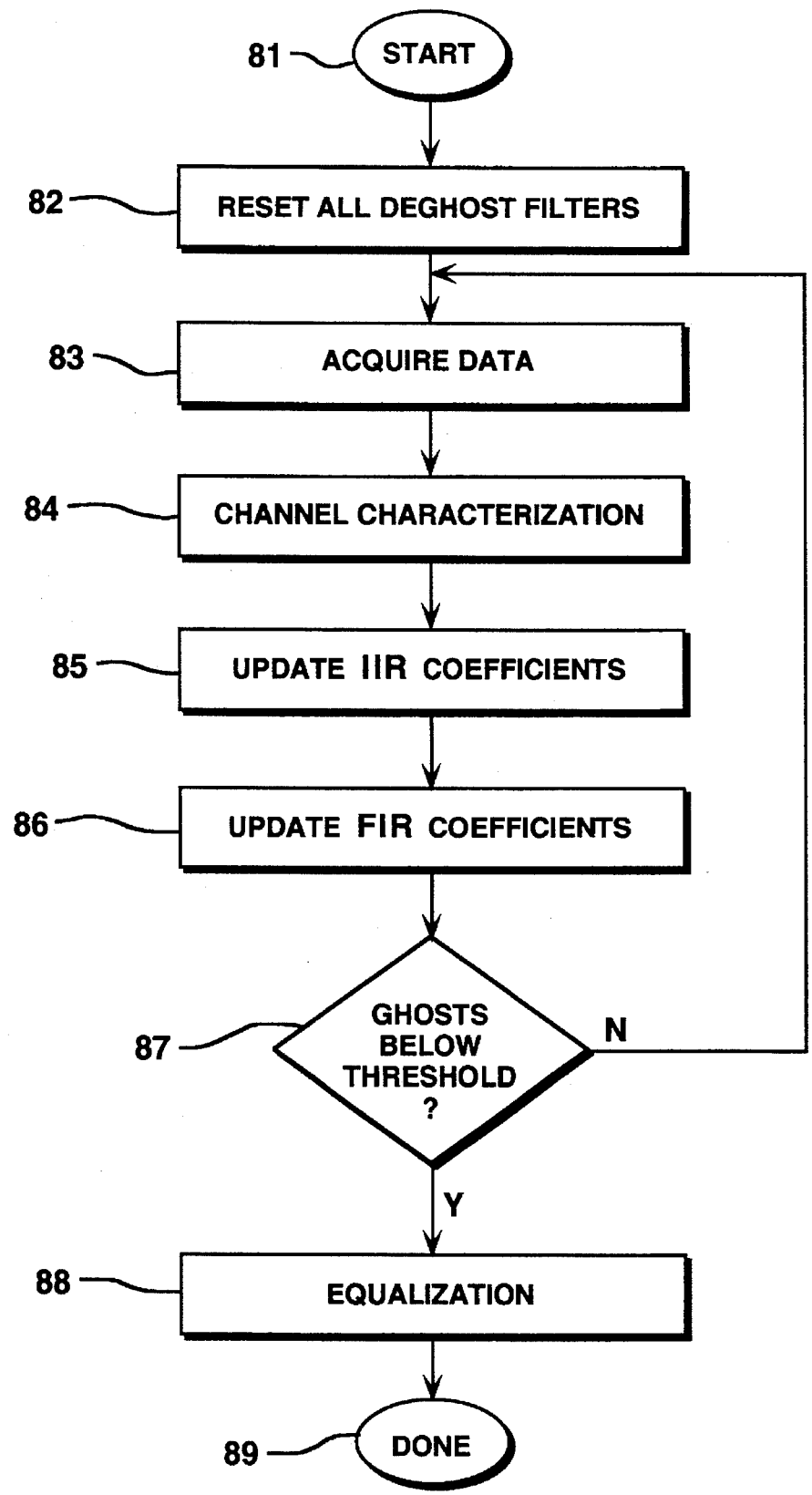
FIG. 7 is a flow diagram of the deghosting method used with the FIG. 6 deghosting circuitry.

The deghosting circuitry 70, which embodies an aspect of the invention and is shown in greater detail in FIG. 6, attenuates or eliminates ghost images to provide a "deghosted" digital composite video signal $V_{DG}$. $V_{DG}$ could be converted to analog form so the rest of the video processing could be carried out in the analog regime.

FIG. 5 shows instead the "deghosted" digital composite video signal $V_{DG}$ being further processed in the digital regime. A digital luma/chroma separator 52, as may employ digital comb filtering, supplies digital chrominance signal to the chroma demodulator 51, which demodulator 51 is operative in the digital regime to supply a pair of digital color-difference signals to analog-to-digital converters 53 and 54, respectively. The luma/chroma separator 52 supplies digital luminance signal to an analog-to-digital converter 55. The analog responses from the analog-to-digital converters 53, 54 and 55 are supplied to color matrix circuitry 56 there to be combined to generate red (R), green (G) and blue (B) signals respectively amplified by amplifiers 57, 58 and 59 to provide R, G and B drive signals for electron guns in a color kinescope 60. The color kinescope 60 has horizontal and vertical deflection coils 61 and 62 for deflecting the electron beams from its guns to trace a raster on its screen. Deflection circuitry 63 responds to horizontal and vertical synchronization pulses from the separator circuitry 29 to supply suitable deflection signals to the deflection coils 61 and 62 for tracing a raster on the kinescope 60 screen.

FIG. 6 shows the deghosting circuitry 70 in greater detail. Digital composite video signal supplied from the analog-to-digital converter 48 is applied as input signal to the cascade connection of an infinite-impulse-response (IIR) filter 71 used to suppress macroghosts that occur after the predominant signal, a finite-impulse-response (FIR) filter 72 used to suppress macroghosts that occur before the predominant signal, and a further FIR filter 73 used to suppress microghosts. The digital filters 71, 72 and 73 are exemplary of the ghost suppression circuits 14 of FIG. 1. The order of the filters 71, 72 and 73 in their cascade connection can be shuffled in various modifications of the deghosting filter 70 without departing from the spirit and scope of the invention. After the operating parameters of the filters 71, 72 and 73 have been established, their cascade connection supplies an "equalized" and "deghosted" digital composite video signal $V_{DG}$ as its output response to the ghosted digital composite video signal $V_{IN}$ supplied from the analog-to-digital converter 48.

A filter-coefficient computer 77 computes the weighting coefficients for the digital filters 71, 72 and 73. These weighting coefficients are binary numbers the filter-coefficient computer 77 writes into registers within the digital filters 71, 72 and 73. In the IIR filter 71 the weighting coefficients stored in registers thereof are used as multiplier signals for digital multipliers receiving the filter output signal with various amounts of delay as multiplicand signals. The product signals from the digital multipliers are combined by addition and subtraction in digital adder/subtractor circuitry to generate the IIR filter response. In each of the FIR filters 72 and 73 the weighting coefficients stored in registers thereof are used as multiplier signals for digital multipliers receiving the filter input signal with various amounts of delay as multiplicand signals. In each of the FIR filters 72 and 73 the product signals from the digital multipliers are combined by addition and subtraction in digital adder/subtractor circuitry to generate the weighted summation response characteristic of an FIR filter.

In embodiments of the digital filters 71, 72 and 73 preferred for economy of hardware, especially insofar as reducing the number of digital multipliers is concerned, the various amounts of delay as multiplicand signals can be programmed, to allow for the omission of digital multipliers for weighting coefficients that are so small as to be essentially zero-valued. Such a so-called sparse-weighting filter will include registers for binary numbers specifying the delays of programmable delay elements which registers are also written by the filter-coefficient computer 77.

FIG. 6 shows a plurality of 1-line stores 750–757, eight in number, being used for temporarily storing the digital GCR signals separated from respective $19^{th}$ VBI scan lines in eight consecutive fields of digitized composite video signal, as selected by the multiplexer 78. These stores are shown as being provided by random access memory (RAM) addressed by a SAMPLE COUNT signal, as would be supplied from the clock regeneration circuitry 50 of FIG. 5 typically at a rate for times color subcarrier frequency $f_c$. Each RAM has storage capability for a respective scan line of pixel samples supplied at $4f_c$ rate.

The separation of the digital GCR signals from the rest of the digitized composite video signal selected by the multiplexer 78 is carried out by the sequential application of write enable commands to the 1-line stores 750–757 during respective $19^{th}$ VBI scan lines in the eight consecutive fields. A decoder 74 responds to a LINE COUNT signal supplied from the clock regeneration circuitry 50 of FIG. 5 to generate a ONE indicative of the $19^{th}$ scan line of the current field being scanned. This ONE as most significant bit and a FIELD COUNT signal supplied from the clock regeneration circuitry 50 of FIG. 5 as the less significant bits are sequentially decoded by decoders 740–747 to supply write enable commands to the 1-line stores 750–757, respectively.

The SAMPLE COUNT, LINE COUNT and FIELD COUNT signals are supplied from the clock regeneration circuitry 50 of FIG. 5 to the filter-coefficient computer 77 of FIG. 6. The filter-coefficient computer 77 responds to the LINE COUNT and FIELD COUNT information to confine its applying read enable commands to the 1-line stores 750–757 only during the time between a line (or two) after the $19^{th}$ scan line of each eighth field and before the $19^{th}$ scan line of the next field. The SAMPLE COUNT signal clocks the read out Read enable commands are applied simultaneously to the 1-line stores 750–757, so they read in parallel to an averaging network 76. The SAMPLE COUNT signal clocks the read out from the 1-line stores 750–757 into the internal memory of the filter-coefficient computer 77. The SAMPLE COUNT signal is supplied to the computer 77 as a basis for it to index the writing of its internal memory.

The averaging network 76, composed of digital adders and subtractors, linearly combines the read out contents of the 1-line stores 750–757 to supply to the filter-coefficient computer 77 a digital GCR signal free of horizontal synchronizing pulse, color burst and porch or pedestal information. For example, if the GCR signal is of the type shown in FIGS. 3A and 3B, the first, third, fifth, and seventh stored VBI lines can be subtractively combined with the second, fourth, sixth and eighth stored VBI lines to generate in quadruplicate a GCR pulse with a 2T leading step edge and a trailing $(\sin x)/x$ step edge. These quadruplicate GCR pulses can be additively combined to improve signal-to-noise in the resulting GCR pulse supplied (with appropriate binary place shift, if desired) to the filter-coefficient computer 77. The signal-to-noise ratio of the data describing the GCR signal can be increased because the GCR signal data being phase-correlated sum arithmetically when combining RAM read-out data, while noise being random-phase sums vectorally.

The elements 74, 740–747, 750–757 and 76 are one embodiment of the GCR signal separator 12 of FIG. 1. One skilled in the art of computer input/output design will be enabled by the foregoing description of this embodiment of the GCR signal separator 12 to design other embodiments. The RAMs in stores 750–757 can be read from asynchronously, using an address multiplexer to select SAMPLE COUNT signal as write addresses to the stores 750–757 and to select read addresses supplied from the filter-coefficient computer 77 in other embodiments of the GCR signal separator 12. The RAMs can be replaced by serial memories of various types in yet other embodiments of the GCR signal separator 12.

In still further embodiments of the GCR signal separator 12 the stores 750–757 may be 2-line stores, which modification is indicated in parentheses in FIG. 6, rather than 1-line stores; and the decoder 74 may be modified to decode the $18^{th}$ VBI scan line as well as the $19^{th}$, which modification is indicated in parentheses in the caption of the decoder 74 block in FIG. 6. The $18^{th}$ VBI scan line information must repeat from field to field so as not to appear in the output signal the averaging network 76 supplies to the filter-coefficient computer 77. This type of GCR signal separator has the capability of cancelling still longer delayed post-ghosts.

Indeed, the components of GCR signals constructed in accordance with the invention can be placed on any VBI line, although line 19 of each successive field is currently preferred. The signal content of other VBI lines previous to the VBI lines containing components of the GCR signal should be constant in the sense of "pair-wise-constant" signal processing if the initial 2T step is to appear earlier than 33 microseconds in GCR signals of the type shown in FIGS. 4A and 4B.

Since the filter-coefficient computer 77 has control over the operating parameters of the filters 71, 72 and 73, by manipulation of those operating parameters the computer 77 can select the point in the cascade connection of these filters from which GCR signal is separated by the elements 74, 740–747, 750–757 and 76 comprising the GCR signal separator 12. For example, the input signal applied to the cascade connection of the filters 71, 72 and 73 can be selected to the GCR signal separator 12 by the computer 77 by setting the weighting coefficients of the recursive paths in the IIR filter 71 to zero values, so the output response of the IIR filter 71 is determined solely by its input signal; by setting to zero all the weighting coefficients except a unity-valued one defining the kernel center in the FIR filter 72; and by setting to zero all the weighting coefficients except a unity-valued one defining the kernel center in the FIR filter 73. Alternatively one can make circuit arrangements that will implement more direct and faster selection of the point in the cascade connection of the filters 71, 72 and 73 from which GCR signal is separated.

The filter-coefficient computer 77 performs windowing procedures on the contents of its internal memory as written from the GCR signal separator 12. These windowing procedures can be done by reading only selected portions of an entire scan line of separated GCR signal as written into the internal memory; or these windowing procedures can be done by writing only selected portions of an entire scan line of separated GCR signal into the internal memory subsequently to be read in its entirety, which latter alternative reduces the storage capacity requirement for the internal memory in computer 77. One windowing procedure separates the ghosted 2T step from the rest of the ghosted GCR signal as a substep in the step of computing or updating the weighting and delay parameters for the deghosting filter 71 that suppresses lagging macroghosts. Another windowing procedure separates the partially deghosted 2T step from the rest of the partially deghosted GCR signal as a substep of the later step of computing or updating the weighting and delay parameters for the deghosting filter 72 that suppresses leading macroghosts. Another windowing procedure separates the deghosted (sin x)/x step from the deghosted GCR signal as a preliminary substep of the still later step of computing or updating the weighting parameters for the equalizing filter 73.

The filter-coefficient computer 77 uses one of a number of methods for completing the steps of computing or updating the weighting and delay parameters for the deghosting filters 71 and 72 after performing the windowing substep for separating the 2T step from the remainder of the GCR signal.

The filter-coefficient computer 77 can, under the control of a cut-and-try computer program, weight and sum the known GCR signal with various incremental delays, as fit within a gating interval. The weighted sums are then compared to the actually received GCR signal and attendant ghosts that occur during the gating interval, as selected from the input signal to the cascaded filters 71, 72 and 73. When a match is found, the filter characteristic of the transmission medium is then known. Once the filter characteristic of the transmission medium is known, the weighting coefficients for a complementary filter can be generated and supplied to the filters 71 and 72. These coefficients condition the filters 71 and 72 to receive the ghosted signal and provide a response with ghost cancelation.

Alternatively, the filter-coefficient computer 77 can be programmed to take the Fourier transform of the ghosted GCR signal that occurs during the gating interval (as selected from the input signal to the cascaded filters 71, 72 and 73), then divide that Fourier transform by the known Fourier transform of the ghost-free GCR signal that occurs during the gating interval, to obtain the Fourier transform of the transmission medium. The filter-coefficient computer 77 is then further programmed to compute the inverse Fourier transform, thus to determine the time-domain response of the transmission medium. The filter-coefficient computer 77 is then still further programmed to compute the weighting coefficients for realizing a complementary filter. These coefficients are then supplied to the filters 71 and 72 to condition them to respond to the ghosted video signal, as supplied from the video detector 44 and digitized by the analog-to-digital converter 48, to generate a deghosted video signal.

The GCR signal shown in FIGS. 3A and 3B is such that the computer 77 software can compute the locations and magnitudes of leading echoes $\leq 10$ µS (back porch with chroma burst, horizontal sync and front-porch). Leading echoes which are outside this range will not be canceled. A 128-tap FIR filter 72 has been used to attenuate all leading echoes over a range that depends on the number of leading ghosts.

The filter-coefficient computer 77 can be arranged so that, after the operating parameters of the ghost-canceling filters 71 and 72 have been calculated, the GCR signal separator 12 comprising elements 74, 740–747, 750–757 and 76 can write into the internal memory of the computer 77 the response of the equalization filter 73 to the deghosted GCR signal or at least the (sin x)/x portion of the deghosted GCR signal. The (sin x)/x portion of this response is then adaptively adjusted to correspond with an ideal response to the (sin x)/x portion of the GCR signal permanently stored within the computer 77, thereby to establish an ideal amplitude response for the cascade connection of filters 71, 72 and 73. This ideal response could be one that is optimally flat across the video band, but an ideal response that exhibits some high-frequency peaking is subjectivity more pleasing to most viewers.

In an alternative arrangement, rather than writing directly into the computer 77 the response of the equalization filter 73 to a portion of the GCR signal, the computer 77 may be written with response to a portion of the GCR signal taken from a point further on in the television receiver. This allows the amplitude-equalization procedure to compensate for roll-offs that may occur further on in the television receiver.

A ghosted signal is the sum of the transmitted signal and its ghosted components of various (lower) amplitudes and phases. Therefore, its deghosted version will be of lower peak-to peak amplitude, so the effective number of bits of resolution in the deghosted signal will be lower than that resulting from digitizing an equal peak-to-peak amplitude unghosted video signal. This should be considered in selecting the precision of the analog-to-digital converter 48. The linearity of the analog-to-digital converter 48 is extremely important for good deghosting performance and must be commensurate with the precision chosen. Ghost-canceling circuitry 70 has been successfully operated using a ten-bit analog-to-digital converter 48 manufactured by TRW, with only nine-bits of its output signal resolution being used, and with care being taken in providing automatic gain control (AGC) and d-c restoration of video detector 44 composite video output signal. In order to adequately attenuate the ghosts, the filters 71 and 72 should have a larger number of bits in their weighting coefficients than the input/output signals have. The filters may be satisfactorily implemented with only nine-bit precision.

FIG. 8 shows the flow diagram of the procedure for establishing the operating parameters of the filters 71, 72 and 73, which procedure is carried out by the filter-coefficient computer 77 and is similar to that described in U.S. patent application Ser. No. 07/891,058. Entry to the START condition 81 of the procedure is at the time power is turned on in the television receiver, when a new channel is tuned, or when a prescribed time has elapsed since the last deghosting procedure. A RESET ALL DEGHOST FILTERS step 82 preferably sets the filter coefficients in the filters 71, 72 and 73 to values previously determined for the channel to which the TV receiver 40 is tuned and stored in a channel-addressed memory. Alternatively, during power up or retuning the filter coefficients in the filters 71, 72 and 73 can be to values associated with a ghost-free signal; and during periodic deghosting previous values of the filter coefficients are retained during "reset". An ACQUIRE DATA step 83 then follows, which step 83 is completed after the number of fields elapse that the computer 77 must wait to fill or update the plurality of stores subsequently reading in parallel to the averaging network 76 to generate a separated GCR signal that is suitable input data for the computer 77.

A CHANNEL CHARACTERIZATION step 84 then takes place. The location in time of the predominant response in the data supplied the computer 77 is detected, then the respective location in time of each successively smaller one of the significantly large ghost responses, up to the number of post-ghosts that can be suppressed by the filter 71 and up to the number of pre-ghosts that can be suppressed by the filter 72. The respective locations in time of the predominant response and multipath responses in the data supplied the computer 77 are calculated to be used as the basis for programming the bulk delay lines interspersed between the clumps of taps in the IIR filter 71 and FIR filter 72. The relative strengths of the predominant response and multipath responses in the data supplied the computer 77 are calculated to be used as the basis for assigning weights to the clumped taps.

An UPDATE IIR COEFFICIENTS step 85 is performed after the CHANNEL CHARACTERIZATION step 84 is performed. The non-zero weighting coeffients of the IIR filter 71 are updated. An UPDATE FIR COEFFICIENTS step 85 is performed after the UPDATE IIR COEFFICIENTS step 84. The non-zero weighting coeffients of the FIR filter 52 are updated. After the UPDATE IIR COEFFICIENTS and UPDATE FIR COEFFICIENTS steps 84 and 85 are performed, a decision step 87 of GHOSTS BELOW THRESHOLD? is reached. If the decision is NO, not all significant ghosts have been canceled although the filters 71 and 72 have the capability to be further adjusted to cancel at least one more ghost, the procedure loops back to the ACQUIRE DATA step 83. A threshold −30 dB down from the predominant image has been used in stop 87. If the decision is YES, all significant ghosts have been canceled or the filters 71 and 72 do not have the capability to be further adjusted to cancel at least one more ghost, the procedure goes on to an EQUALIZATION stop 88 in which weighting coefficients for the amplitude-equalization filter 73 are calculated.

The EQUALIZATION step 88 can be performed by taking the discrete Fourier transform (DFT) of the response of the cascade connection of the filters 71, 72 and 73 to the correlator response, then dividing it by the DFT of the ideal correlator response as stored in the memory of the computer 77, thereby to obtain the basis for calculating the adjustments necessary in the tap weights of the FIR filter 73. Since the number of taps for the FIR filter 73 is no more than thirty-two, the number of spectral bins in the DFT is reasonably small; however, the DFT calculations tend to be lengthy.

An alternative, more rapid way to calculate equalization filter coefficients is to use a least-means-squares method to adjust the filter 73 weighting coefficients so that the response of the cascade connection of filters 71–73 to the averaging network 76 best fits an ideal response stored in the memory of the computer 77.

Following the EQUALIZATION step 88 the FIG. 8 procedure reaches the done condition 89 DONE. It is preferred that the UPDATE FIR COEFFICIENTS step 85 and the EQUALIZATION step 88 be performed after the UPDATE IIR COEFFICIENTS step 85 is performed, because the higher-order ghosts generated in the IIR-filtering can be accounted for before the FIR filtering coefficients are computed, so the FIR filtering coefficients can be computed so as to suppress those higher-order ghosts.

The present invention has been described by way of exemplary embodiments. Various changes and modifications will be apparent to those skilled in the art to which it pertains. For example, while the examples used generally relate to the NTSC system, as will be apparent, the invention is readily applicable to other systems and standard, including the PAL system and so forth. It is intended that the invention be applicable to transmission by way of radio wave as well as by cable transmission. Furthermore, various time intervals are used in the examples given, and while such time intervals serve to illustrate the principles underlying the invention, various changes may be made without changing the basic operation. Such changes and the like are intended to be within the scope and spirit of the invention which is only defined by the claims following and their equivalents.

What is claimed is:

1. A reference signal signal generating circuit for generating a ghost canceling reference signal for insertion into a composite video signal, said composite video signal being descriptive of scanning of image frames horizontal scan line by horizontal scan line in accordance with horizontal and vertical synchronization signals within said composite video signal, said ghost canceling reference signal being of a type extending over the period of each said horizontal scan line and being generated during prescribed horizontal scan lines of said composite video signal occuring in respective vertical blanking intervals of said composite video signal, comprising:

means for separating said synchronization signals from said composite video signal;

means for generating a prescribed plural number of clock signals over the period of each said horizontal scan line, in response to said separated synchronization signals;

means for generating a plurality of gating pulses during at least one prescribed scan line in each said image frame, in dependence upon said synchronization signals and clock signals;

a plurality of addressable memory means storing components of a ghost cancelation reference signal without change during the course of a succession of said image frames, for reading responsive to address signals during said one prescribed scan line in each said image frame;

means for generating the address signals for said plurality of addressable memory means by counting said clock signals that occur during said one prescribed scan line in each said image frame;

a multiplexer for combining said components under control of said gating pulses, thereby to generate digital representations of said ghost cancelation reference signal;

a digital-to-analog converter for converting said digital representations of said ghost cancelation reference signal to analog form, thereby providing said ghost cancelation reference signal; and superposition circuitry for inserting said ghost cancelation reference signal into said one prescribed scan line in each said image frame.

2. A ghost canceling reference signal transmission and reception system comprising:

source means for producing a ghost canceling reference signal, said ghost canceling reference signal comprising a first, leading edge 2T type step and a second, trailing edge (sin x)/x step;

means for superposing said ghost canceling reference signal on a television signal for transmission during a prescribed horizontal scan line in each of vertical blanking intervals of said television signal;

transmission means for transmitting said television signal having said ghost canceling reference signal superposed thereon; and receiving means for receiving said television signal having been transmitted, including cancelation means for canceling a ghost signal, means for retrieving said ghost canceling reference signal from said television signal after having been received, and means for processing said ghost canceling reference signal for deriving from said leading edge 2T type step a ghost suppression control signal for controlling said cancelation means.

3. A ghost canceling reference signal transmission and reception system as recited in claim 2, wherein said ghost canceling reference signal is relatively constant in level from said first, leading edge step to said second, trailing edge step.

4. A ghost canceling reference signal transmission and reception system as recited in claim 3, wherein:

said first step is a "simple" 0 to 70 IRE 2T type step having a rise time (10 to 90%) of about 250 nanoseconds; and said second step is a 70 to 0 IRE (sin x)/x type step having a fall time (90 to 10%) of about 250 nanoseconds.

5. A ghost canceling reference signal transmission and reception system as recited in claim 4, wherein:

said first step begins about 30 microseconds after the start of a horizontal sync pulse.

6. A ghost canceling reference signal transmission and reception system as recited in claim 4, wherein:

said first step begins about 33 microseconds after the start of a horizontal sync pulse.

7. A ghost canceling reference signal transmission and reception system as recited in claim 4, wherein each horizontal line in which said ghost canceling reference signal is included is transmitted without color burst.

8. A ghost canceling reference signal transmission and reception system as recited in claim 4, wherein:

successive image fields of said television signal are considered to be consecutively ordinally numbered in order of their occurrence in time;

each horizontal line in which said ghost canceling reference signal with first and second steps is included also includes a color burst in a conventional interval therefor, which color burst comprises chrominance carrier having a phasing that changes from frame to frame;

said prescribed horizontal scan lines recur regularly and occur only in odd-numbered fields of said television signal, and each even-numbered field of said television signal includes a selected horizontal scan line in a vertical blanking interval thereof, which said selected horizontal scan lines recur regularly and include respective color bursts;

said first step begins about 30 microseconds after the start of a horizontal sync pulse; and said ghost canceling reference signal further comprises, during each of said selected horizontal scan lines which occur in even-numbered fields of said television signal, a flat portion at 0 IRE in the portion of said selected horizontal scan line corresponding to the portion of each said prescribed horizontal scan line between and including said first and second steps.

9. A ghost canceling reference signal transmission and reception system as recited in claim 8, wherein said means for processing said ghost canceling reference signal for deriving therefrom a ghost cancelation control signal for controlling said cancelation means is of a type for combining corresponding portions of said ghost canceling reference signal in paired ones of said prescribed and selected horizontal scan lines, as differentially delayed by one field time to occur concurrently in time with each other, said combining being in accordance with the one of additive and subtractive combining that suppresses said color bursts in the response therefrom, thereby to separate said first and second steps of said ghost canceling reference signal together from said ghost canceling reference signal.

10. A ghost canceling reference signal transmission and reception system as recited in claim 8, including equalization means for correcting video response being coupled to said ghost suppression circuitry, and wherein said ghost suppression circuitry provides a deghosted ghost canceling reference signal as a control signal to said equalization means.

11. A ghost canceling reference signal transmission and reception system as recited in claim 10, wherein said cancelation means processes said video signal from which said ghost cancelation control signal was derived for providing a deghosted video signal.

12. A ghost canceling reference signal transmission and reception system as recited in claim 4, wherein:

successive image fields of said television signal are considered to be consecutively ordinally numbered in order of their occurrence in time;

each horizontal line in which said ghost canceling reference signal with first and second steps is included also includes a color burst in a conventional interval therefor, which color burst comprises chrominance carrier having a phasing that changes from frame to frame;

said prescribed horizontal scan lines recur regularly and occur only in even-numbered fields of said television signal, and each odd-numbered field of said television signal includes a selected horizontal scan line in a vertical blanking interval thereof, which said selected horizontal scan lines recur regularly;

said first step begins about 30 microseconds after the start of a horizontal sync pulse; and said ghost canceling reference signal further comprises, during each of said selected horizontal scan lines which occur in odd-numbered fields of said television signal, a flat portion at 0 IRE in the portion of said selected horizontal scan line corresponding to the portion of each said prescribed horizontal scan line between and including said first and second steps.

13. A ghost canceling reference signal transmission and reception system as recited in claim 12, wherein said means for processing said ghost canceling reference signal for deriving therefrom a ghost cancelation control signal for controlling said cancelation means is of a type for combining corresponding portions of said ghost canceling reference signal in paired ones of said prescribed and selected horizontal scan lines, as differentially delayed by one field time to occur concurrently in time with each other, said combining being in accordance with the one of additive and subtractive combining that suppresses said color bursts in the response therefrom, thereby to separate said first and second steps of said ghost canceling reference signal together from said ghost canceling reference signal.

14. A ghost canceling reference signal transmission and reception system as recited in claim 13, including equalization means for correcting video response being coupled to said cancelation means, and wherein said cancelation means provides a deghosted ghost canceling reference signal as a control signal to said equalization means.

15. A ghost canceling reference signal transmission and reception system as recited in claim 14, wherein said cancelation means processes said video signal from which said ghost cancelation control signal was derived for providing a deghosted video signal.

16. A source for producing a ghost canceling reference signal for inclusion in a composite video signal descriptive of television images supplied at a prescribed frame rate and scanned scan line by scan line at a scan line rate of prescribed constant value, comprising:

clock generator means for generating clock signals at a prescribed multiple of said scan line rate;

an address counter cyclically counting the number of clock signals generated by said clock generator during a prescribed number of scan lines, thereby to generate a succession of addresses;

gating signal generator means, responsive to each of selected groups of said addresses, for generating a respective one of gating signals;

memory means for storing information defining said ghost canceling reference signal in digital form at storage locations therein selectively read from responsive to respective ones of said addresses; and means, controlled by said gating signals, for selectively combining portions of said information read from said memory means, thereby to generate the whole of said ghost canceling reference signal.

17. A source for producing a ghost canceling reference signal in accordance with claim 16, wherein said clock generator means is of a type responsive to a sync signal supplied at said scan line rate for generating clock signals at a prescribed multiple of said scan line rate, said source including sync separator means for separating said sync signal from a television signal.

18. A source for producing a ghost canceling reference signal in accordance with claim 17, wherein said gating signal generator means provides a field identification signal as one of said gating signals.

19. A source for producing a ghost canceling reference signal for inclusion in a composite video signal descriptive of television images supplied at a prescribed frame rate and scanned scan line by scan line at a scan line rate of prescribed constant value, comprising:

clock generator means, responsive to a sync signal supplied at said prescribed scan line rate, for generating clock signals at a prescribed multiple of said scan line rate;

an address counter cyclically counting the number of clock signals generated by said clock generator during a number of frames at least one, thereby to generate a succession of addresses;

a plurality of read-only memories, each read-only memory generating a portion of said ghost canceling reference signal in digital form by selectively reading from the storage locations therein responsive to said succession of addresses;

gating signal generator means, responsive to each of selected groups of said addresses, for providing a respective gating signal, one of said gating signals being a field identification signal;

selection means for generating in digital form the whole of said ghost canceling reference signal by cyclically selecting responsive to said gating signals from said portions of said ghost canceling reference signal generated in digital form from said plurality of read-only memories; and a digital-to-analog converter responding to said ghost canceling reference signal generated in digital form by said selection means for generating in analog form the whole of said ghost canceling reference signal.

20. A source for producing a ghost canceling reference signal in accordance with claim 19, wherein a first of said read-only memories stores a zero to seventy IRE 2T-type step as a component of said ghost canceling reference signal and a second of said read-only memories stores a seventy to zero IRE (sin x)/x type step as a component of said ghost canceling reference signal.

21. A source for producing a ghost canceling reference signal in accordance with claim 20, wherein said means for providing said ghost canceling reference signal comprises a multiplexer.

22. An electrical signal generator for generating a ghost canceling reference signal, manifested in electrical signal form, for inclusion in each of selected scan lines of a video signal, also manifested in electrical signal form, wherein said ghost canceling reference signal comprises:

a first, leading edge 2T type step occuring near the middle of each scan line in which said ghost canceling reference signal is included;

a second, trailing edge (sin x)/x type step occuring near the conclusion of each scan line in which said ghost canceling reference signal is included.

23. An electrical signal generator for generating a ghost canceling reference signal in accordance with claim 22, wherein said signal comprises:

a relatively constant level region intermediate said first and second steps; and wherein said electrical signal generator includes therewithin memory means for storing said relatively constant level region of said ghost canceling reference signal.

24. An electrical signal generator in accordance with claim 23, wherein:

said first step is a "simple" 0 to 70 IRE 2T type step having a rise time (10 to 90%) of about 250 nanoseconds; and said second step is a 70 to 0 IRE (sin x)/x type step having a fall time (90 to 10%) of about 250 nanoseconds.

25. A ghost canceling reference signal transmission and reception system utilizing a ghost canceling reference signal including a 2T type step near the middle of a horizontal scan line, followed by a (sin x)/x type step near the conclusion of said horizontal scan line.

26. A ghost canceling reference signal transmission and reception system utilizing a ghost canceling reference signal including a zero to seventy IRE 2T type step followed by a seventy to zero IRE (sin x)/x type step, wherein said zero to seventy IRE 2T type step is utilized for determining the filtering provided by a ghost-suppression filter during reception.

27. A ghost canceling reference signal transmission and reception system in accordance with claim 26, wherein said seventy to zero IRE (sin x)/x type step is utilized for performing waveform equalization on response supplied from said ghost-suppression filter during reception, but is not otherwise utilized for determining the filtering provided by said ghost-suppression filter.

28. A method for canceling ghosts in a televised video signal, comprising the steps of:

producing a ghost canceling reference signal, said ghost canceling reference signal comprising a first, leading edge 2T type step;

superposing said ghost canceling reference signal on a prescribed horizontal scan line of a video signal in a vertical blanking interval of said video signal;

transmitting, in a television signal, said video signal having said ghost canceling reference signal superposed thereon;

receiving said television signal after its having been transmitted;

detecting from the received television signal a reproduced said video signal having said ghost canceling reference signal superposed thereon, which reproduced video signal is subject to the inclusion of ghosts therewith;

separating said ghost canceling reference signal from said reproduced video signal;

processing said ghost canceling reference signal for deriving from the first, leading edge 2T type step thereof a ghost cancelation control signal; and utilizing said ghost cancelation control signal to cancel said ghosts included with said reproduced video signal.

29. A method providing for canceling ghosts in a televised video signal, said method comprising the steps of:

producing and televising together with a video signal, during a vertical blanking interval of said video signal, a ghost canceling reference signal comprising a "simple" 0 to 70 IRE 2T type step, occuring near the middle of a scan line in said vertical blanking interval and having a rise time (10 to 90%) of about 250 nanoseconds; and a 70 to 0 IRE (sin x)/x type step, occuring near the conclusion of said scan line in said vertical blanking interval and having a fall time (90 to 10%) of about 250 nanoseconds.

30. A method for canceling ghosts in a televised video signal including, during a vertical blanking interval thereof, a ghost canceling reference signal comprising a "simple" 0 to 70 IRE 2T type step as a leading edge and a 70 to 0 IRE (sin x)/x type step as a trailing edge, said method comprising the steps of:

receiving said televised signal, including said ghost canceling reference signal, as a received signal;

utilizing said first step of said ghost canceling reference signal from said received signal, to deghost said received signal including said video signal and said ghost canceling reference signal, thereby to produce a deghosted video signal and a deghosted ghost canceling reference signal; and utilizing said second step from said deghosted ghost canceling reference signal to perform waveform equalization on said deghosted video signal.

31. A method for canceling ghosts in a televised video signal, said video signal including in each of vertical blanking intervals therewithin a ghost canceling reference signal comprising a "simple" 2T type step rising from lower to higher IRE number followed by a (sin x)/x type step falling from higher to lower IRE number, said method comprising the steps of:

initializing the filtering parameters of a cascade connection of a ghost cancellation filter and an equalization filter, which filter parameters are adjustable in response to parameter determining signals stored in registers associated with said ghost cancellation and said equalization filters;

applying said televised video signal to said cascade connection of said ghost cancellation and said equalization filters, thereby to cause a response from said cascade connection of said ghost cancellation and said equalization filters;

separating said ghost canceling reference signal from said response from said cascade connection of said ghost cancellation and said equalization filters;

utilizing said first step of said separated ghost canceling reference signal to determine the adjustments to be made to the filtering parameters of said ghost cancellation filter in order to deghost said separated ghost canceling reference signal and thereby to supply deghosted video signal from said ghost cancellation filter; and after the foregoing step, utilizing said second step of said deghosted ghost canceling reference signal to determine the adjustments to be made to the filtering parameters of said equalization filter, thereby to perform waveform equalization for said ghost canceling reference and video signals.

32. A television receiver, including ghost cancelation means for canceling a ghost signal, means for retrieving a ghost canceling reference signal from a received television signal, and means for processing said ghost canceling reference signal for deriving therefrom a ghost cancelation control signal for controlling said ghost cancelation means, wherein said ghost canceling reference signal comprises a first, leading edge 2T type step and a second trailing edge (sin x)/x type step, and wherein said means for processing said ghost canceling reference signal derives said ghost canceling reference signal in response to said first, leading edge 2T type step.

33. A television receiver as recited in claim 32, wherein said ghost canceling reference signal is relatively constant in level from said first, leading edge step to said second, trailing edge step.

34. A television receiver as recited in claim 33, wherein:

said first step is a "simple" 0 to 70 IRE 2T type step having a rise time (10 to 90%) of about 250 nanoseconds; and said second step is a 70 to 0 IRE (sin x)/x type step having a fall time (90 to 10%) of about 250 nanoseconds.

35. A television receiver as recited in claim 34, wherein:

said first step begins about 30 microseconds after the start of a horizontal sync pulse.

36. A television receiver as recited in claim 34, wherein:

said first step begins about 33 microseconds after the start of horizontal sync pulse.

37. A television receiver as recited in claim 34, wherein:

successive image fields of said television signal are considered to be consecutively ordinally numbered in order of their occurrence in time;

each horizontal line in which said ghost canceling reference signal with first and second steps is included also includes a color burst in a conventional interval therefor, which color burst comprises chrominance carrier having a phasing that changes from frame to frame;

said prescribed horizontal scan lines recur regularly and occur only in odd-numbered fields of said television signal, and each even-numbered field of said television signal includes a selected horizontal scan line in a vertical blanking interval thereof, which said selected horizontal scan lines recur regularly and include respective color bursts;

said first step begins about 30 microseconds after the start of a horizontal sync pulse; and said ghost canceling reference signal further comprises, during each of said selected horizontal scan lines which occur in even-numbered fields of said television signal, a flat portion at 0 IRE in the portion of said selected horizontal scan line corresponding to the portion of each said prescribed horizontal scan line between and including said first and second steps.

38. A television receiver as recited in claim 37, wherein said means for processing said ghost canceling reference signal for deriving therefrom a ghost cancelation control signal for controlling said cancelation means is of a type for combining corresponding portions of said ghost canceling reference signal in paired ones of said prescribed and selected horizontal scan lines, as differentially delayed by one field time to occur concurrently in time with each other, said combining being in accordance with the one of additive and subtractive combining that suppresses said color bursts in the response therefrom, thereby to separate said first and second steps of said ghost canceling reference signal together from said ghost canceling reference signal.

39. A television receiver as recited in claim 34, wherein:

successive image fields of said television signal are considered to be consecutively ordinally numbered in order of their occurrence in time;

each horizontal line in which said ghost canceling reference signal with first and second steps is included also includes a color burst in a conventional interval therefor, which color burst comprises chrominance carrier having a phasing that changes from frame to frame;

said prescribed horizontal scan lines recur regularly and occur only in even-numbered fields of said television signal, and each odd-numbered field of said television signal includes a selected horizontal scan line in a vertical blanking interval thereof, which said selected horizontal scan lines recur regularly;

said first step begins about 30 microseconds after the start of a horizontal sync pulse; and said ghost canceling reference signal further comprises, during each of said selected horizontal scan lines which occur in odd-numbered fields of said television signal, a flat portion at 0 IRE in the portion of said selected horizontal scan line corresponding to the portion of each said prescribed horizontal scan line between and including said first and second steps.

40. A television receiver as recited in claim 39, wherein said means for processing said ghost canceling reference signal for deriving therefrom a ghost cancelation control signal for controlling said cancelation means is of a type for combining corresponding portions of said ghost canceling reference signal in paired ones of said prescribed and selected horizontal scan lines, as differentially delayed by one field time to occur concurrently in time with each other, said combining being in accordance with the one of additive and subtractive combining that suppresses said color bursts in the response therefrom, thereby to separate said first and second steps of said ghost canceling reference signal together from said ghost canceling reference signal.

41. A television receiver as recited in claim 37, including equalization means for correcting video response being coupled to said cancelations means, and wherein said cancelation means provides a deghosted ghost canceling reference signal as a control signal to said equalization means.

42. A television receiver, including means for separating a ghost canceling reference signal, wherein said ghost canceling reference signal comprises:

a first, "simple" 0 to 70 IRE 2T type step, occuring near the middle of a scan line in said vertical blanking interval and having a rise time (10 to 90%) of about 250 nanoseconds; and a second, 70 to 0 IRE (sin x)/x type step, occuring near the conclusion of said scan line in said vertical blanking interval and having a fall time (90 to 10%) of about 250 nanoseconds.

43. A television receiver comprising:

means for separating a ghost canceling reference signal that comprises, within an envelope of at least 70 IRE units amplitude a leading first step sufficiently slow in rise time that all significant frequency components thereof are within the bandwidth for a broadcast television signal, and a trailing second step of that falls with (sin x)/x variation for positive x;

means for utilizing said first step of said ghost canceling reference signal to deghost said ghost canceling reference signal so as to produce a deghosted ghost canceling reference signal; and means for utilizing said second step of said deghosted ghost canceling reference signal to perform waveform equalization.

44. A television receiver comprising:

means for separating a ghost canceling reference signal that comprises, within an envelope of at least 70 IRE units amplitude, a leading first step sufficiently slow in rise time that all significant frequency components thereof are within the bandwidth for a broadcast television signal, and a trailing second step of that falls with (sin x)/x variation for positive x;

means for utilizing said first step of said ghost canceling reference signal to deghost said ghost canceling reference signal so as to produce a deghosted ghost canceling reference signal and a deghosted video signal from which the deghosted reference signal was derived;

means for utilizing said second step of said deghosted ghost canceling reference signal to perform waveform equalization of the video signal.

45. A television transmitter comprising means for producing and transmitting, during a horizontal scan line during a vertical blanking interval, a ghost canceling reference signal comprising:

a "simple" 0 to 70 IRE 2T type step occuring near the middle of said horizontal scan line and having a rise time (10 to 90%) of about 250 nanoseconds; and a 70 to 0 IRE (sin x)/x type step near the conclusion of said horizontal scan line and having a fall time of about 250 nanoseconds.

46. A ghost canceling reference signal, manifested in electrical signal form during passage through a television transmitting and receiving system, a receiving portion of which system includes ghost cancellation filtering with an electrically programmable kernel and equalization filtering with an electrically programmable kernel, wherein said signal comprises, within an envelope of at least 70 IRE units amplitude;

a leading edge sufficiently slow that all significant frequency components thereof are within the bandwidth for a broadcast television signal, to avoid ringing being associated with that edge when the ghost canceling reference signal is passed through said television transmitting and receiving system, thereby to facilitate the programming of the kernel of said ghost cancellation filtering in said receiving portion of said television transmitting and receiving system; and (sin x)/x variation for positive x in a portion of the ghost reference signal following said leading edge and having substantially all of its high frequency energy near the conclusion of each scan line, for causing said ghost canceling reference signal to include sufficient high frequency to facilitate the programming of the kernel of said equalization filtering in said receiving portion of said television transmitting and receiving system.

47. A generator for generating said ghost canceling reference signal set forth in claim 46.

48. A generator for said ghost canceling reference signal, as claimed in claim 47 included in a television transmitter for transmitting a video carrier wave modulated in accordance with a composite video signal descriptive of the horizontal line scanning of successive image fields interspersed with vertical blanking intervals, said television transmitter further including:

means for selecting prescribed horizontal scan lines in said vertical blanking intervals for the transmission of said ghost canceling reference signal; and means for multiplexing said ghost canceling reference signal into said composite video signal during said selected horizontal scan lines.

49. Receiving apparatus for receiving a television signal comprising a video carrier wave modulated in accordance with a composite video signal descriptive of the horizontal line scanning of successive image fields interspersed with vertical blanking intervals, said composite video signal including within prescribed horizontal scan lines of vertical blanking intervals a ghost canceling reference signal, said receiving apparatus comprising:

means for detecting said television signals including
a video detector for supplying a ghosted composite video signal;
means for separating the ghost canceling reference signal portions of said ghosted composite video signal from the other portions thereof;
a ghost cancellation filter provided with adjustable filtering weights;
an equalization filter provided with adjustable filtering weights;
means connecting said ghost cancellation filter and said equalization filter in cascade connection, said cascade connection having an input port connected to which said ghosted composite video signal is supplied from said video detector and having an output port;

means, responding to the separated ghost canceling reference signal portions of said ghosted composite video signal, for calculating a discrete Fourier transform (DFT) thereof;

means responding to that DFT for determining the adjustable filtering weights of the ghost cancellation filter;

means for separating the ghost canceling reference signal portions of a deghosted composite video signal supplied from a point in said cascade connection of said ghost cancellation filter and said equalization filter after the adjustable filtering weights of the ghost cancellation filter have been determined; and means, responding to the separated ghost canceling reference signal portions of said deghosted composite video signal, for determining the adjustable filtering weights of the equalization filter, thereby to cause an equalized deghosted composite video signal response to said ghosted composite video signal to be provided at the output port of said cascade connection of said ghost cancellation filter and said equalization filter; said ghost canceling reference signal comprising within an envelope of at least 70 IRE units amplitude;

a leading edge sufficiently slow that all significant frequency components thereof are within the bandwidth for a broadcast television signal, to avoid ringing being associated with that edge when the ghost canceling reference signal is passed through said television transmitting and receiving system, thereby to facilitate the programming of the kernel of said ghost cancellation filter; and substantially $(\sin x)/x$ variation for positive x in a portion of the signal following said leading edge sufficient high frequency thereby being included in the signal to facilitate the programming of the kernel of said equalization filter.

50. A television transmitter for transmitting a video carrier wave modulated in accordance with a composite video signal descriptive of the horizontal line scanning of successive image fields interspersed with vertical blanking intervals, said television transmitter comprising:

means for selecting prescribed horizontal scan lines in said vertical blanking intervals for the inclusion of a ghost canceling reference signal in said composite video signal;

means for generating recurring clock signals during each selected prescribed horizontal scan line;

means for counting the recurring clock signals during each selected prescribed horizontal scan line to generate an addressing scan;

memory means for storing a ghost canceling reference signal and for responding to said addressing scan to read out successive samples of said ghost canceling reference signal, having a leading edge substantially just slow enough that all significant frequency components thereof are within a prescribed bandwidth for said composite video signal and having $(\sin x)/x$ variation for positive x in a portion of the ghost canceling reference signal following said leading edge for increasing the high frequency content of said ghost canceling reference signal, said ghost canceling reference signal having substantially all of its high frequency energy near the conclusion of each scan line;

means for converting the successive samples of said ghost canceling reference signal read out from said memory means to an analog ghost canceling reference signal; and means for multiplexing said analog ghost canceling reference signal at least 70 IRE units amplitude level into said composite video signal during said selected horizontal scan lines.

51. A television transmitter for transmitting a video carrier wave modulated in accordance with a composite video signal descriptive of the horizontal line scanning of successive image fields interspersed with vertical blanking intervals, said television transmitter comprising:

means for selecting prescribed horizontal scan lines in said vertical blanking intervals for the inclusion of an analog ghost canceling reference signal in said composite video signal;

means for generating said analog ghost canceling reference signal with a respective leading edge near the middle of each of said prescribed horizontal scan lines, each said leading edge being just slow enough that all significant frequency components thereof are within a prescribed bandwidth for said composite video signal thereby to facilitate calculations of ghost cancellation filtering parameters in television receivers for use with said television transmitter, said ghost canceling reference signal exhibiting substantially (sin x)/x variation for positive x in portions of the signal following said leading edges in said prescribed horizontal scan lines to include within said ghost canceling reference signal sufficient high frequency to facilitate calculations of equalization filtering in television receivers for use with said television transmitter; and means for multiplexing said analog ghost canceling reference signal at at least 70 IRE units amplitude level into said composite video signal during said selected horizontal scan lines.

52. A television transmitter as set forth in claim 51, wherein said means for generating said ghost canceling reference signal generates 2T type steps as said leading edges.

53. A television transmitter as set forth in claim 52, wherein said means for generating said ghost canceling reference signal generates a trailing edge (sin x)/x type step after each 2T type step, said trailing edge (sin x)/x type step being generated in the same prescribed horizontal scan line as said 2T type step after which it is generated, but near the conclusion of said same prescribed horizontal scan line.

54. A television transmitter as set forth in claim 51, wherein said means for generating said ghost canceling reference signal comprises:

means for generating recurring clock signals during each selected prescribed horizontal scan line;

means for counting the recurring clock signals during each selected prescribed horizontal scan line to generate an addressing scan;

memory means for storing said ghost canceling reference signal and for responding to said addressing scan to read out successive samples of said ghost canceling reference signal; and means for converting the successive samples of said ghost canceling reference signal read out from said memory means to said analog ghost canceling reference signal.

55. A television receiver as recited in claim 44, wherein said means for utilizing said second step of said deghosted ghost canceling reference signal to perform waveform equalization is of a type that utilizes said second step of said deghosted ghost canceling reference signal only to perform waveform equalization.

\* \* \* \* \*